US012582905B2

(12) United States Patent
Hayata

(10) Patent No.: US 12,582,905 B2
(45) Date of Patent: Mar. 24, 2026

(54) INFORMATION PROCESSING DEVICE, INFORMATION PROCESSING METHOD, AND PROGRAM FOR DISPLAYING BANNER BASED ON USER HISTORY DATA

(71) Applicant: GREE, INC., Tokyo (JP)

(72) Inventor: Daiki Hayata, Tokyo (JP)

(73) Assignee: GREE HOLDINGS, INC., Tokyo (JP)

( * ) Notice: Subject to any disclaimer, the term of this patent is extended or adjusted under 35 U.S.C. 154(b) by 421 days.

(21) Appl. No.: 18/087,475

(22) Filed: Dec. 22, 2022

(65) Prior Publication Data

US 2023/0201716 A1       Jun. 29, 2023

(30) Foreign Application Priority Data

Dec. 27, 2021    (JP) .................................. 2021-211973

(51) Int. Cl.
*A63F 13/52*        (2014.01)
*A63F 13/69*        (2014.01)
*A63F 13/79*        (2014.01)

(52) U.S. Cl.
CPC .............. *A63F 13/52* (2014.09); *A63F 13/69* (2014.09); *A63F 13/79* (2014.09)

(58) Field of Classification Search
CPC .......... A63F 13/52; A63F 13/69; A63F 13/79; A63F 13/61; A63F 13/798
See application file for complete search history.

(56) References Cited

U.S. PATENT DOCUMENTS

| | | | | |
|---|---|---|---|---|
| 6,219,045 B1 * | 4/2001 | Leahy | ..................... | H04L 67/10 |
| | | | | 709/204 |
| 9,369,543 B2 * | 6/2016 | Murphy | ................ | H04L 67/131 |
| 10,576,366 B2 * | 3/2020 | Mizuki | .............. | A63F 13/5375 |
| 10,786,736 B2 * | 9/2020 | Weising | .............. | A63F 13/5378 |
| 10,857,464 B2 * | 12/2020 | Sulakhe | .............. | A63F 13/5375 |
| 11,882,172 B2 * | 1/2024 | Sawaki | ................... | H04L 67/02 |

(Continued)

FOREIGN PATENT DOCUMENTS

| | | |
|---|---|---|
| JP | 2015-184689 A | 10/2015 |
| JP | 2021-020074 A | 2/2021 |

OTHER PUBLICATIONS

Feb. 12, 2025 Office Action issued in Japanese Patent Application No. 2022-019384.

*Primary Examiner* — Chase E Leichliter
(74) *Attorney, Agent, or Firm* — Oliff PLC

(57) ABSTRACT

An information processing device includes circuitry that manages distribution of a video including animation of an avatar object corresponding to a user. The circuitry acquires history data including user action history relating to the distribution or viewing of the video from a user device used by the user, and records the history data in a memory. The circuitry acquires the history data of the user associated with a selection screen selected by the user, from among the history data. The circuitry specifies each banner display condition corresponding to a plurality of banners associated with the selection screen. The circuitry determines a condition that matches the acquired history data, from among the specified banner display conditions. The circuitry selects a banner corresponding to the banner display condition that matches the history data, from among the plurality of banners, and sends drawing data for the banner to the user device.

13 Claims, 14 Drawing Sheets

(56)  References Cited

U.S. PATENT DOCUMENTS

| | | | |
|---|---|---|---|
| 2007/0050716 A1* | 3/2007 | Leahy | H04L 67/52 |
| | | | 715/706 |
| 2008/0215994 A1* | 9/2008 | Harrison | H04L 67/131 |
| | | | 715/757 |
| 2009/0227368 A1* | 9/2009 | Wyatt | A63F 13/45 |
| | | | 463/31 |
| 2011/0281648 A1* | 11/2011 | Weising | A63F 13/5378 |
| | | | 463/32 |
| 2013/0326354 A1* | 12/2013 | Anderson | G06Q 30/0241 |
| | | | 715/764 |
| 2014/0349749 A1* | 11/2014 | Nogami | A63F 13/795 |
| | | | 463/31 |
| 2015/0224399 A1* | 8/2015 | Melo | A63F 13/822 |
| | | | 463/29 |
| 2015/0328549 A1* | 11/2015 | Tanaka | A63F 13/85 |
| | | | 463/31 |
| 2015/0338648 A1* | 11/2015 | Tait | A63F 13/825 |
| | | | 463/31 |
| 2016/0275560 A1* | 9/2016 | Ito | G06Q 30/0209 |
| 2018/0178128 A1* | 6/2018 | Onda | A63F 13/61 |
| 2018/0181976 A1* | 6/2018 | Takei | G06Q 30/0277 |
| 2018/0181977 A1* | 6/2018 | Takei | A63F 13/61 |
| 2018/0181987 A1* | 6/2018 | Omori | A63F 13/69 |
| 2019/0143218 A1* | 5/2019 | Sulakhe | A63F 13/55 |
| | | | 463/40 |
| 2023/0101386 A1* | 3/2023 | Kudo | G06T 11/60 |
| | | | 345/634 |
| 2023/0201716 A1* | 6/2023 | Hayata | A63F 13/79 |
| | | | 463/31 |
| 2024/0293753 A1* | 9/2024 | Taguchi | A63F 13/87 |

* cited by examiner (USER MANAGEMENT DATA)                          ~50

| USER ID | COINS | POINTS |
|---------|-------|--------|
| ****** | 5000C | 10000Pt |
| ****** | 0C | 100Pt |

(VIEWING HISTORY DATA)                                                              ~51, 60

| USER ID (VIEWING USER) | DISTRIBUTION NUMBER | USER ID (DISTRIBUTING USER) | VIEWING DATE/TIME | VIEWING TIME | CUMULATIVE VIEWING TIME | CUMULATIVE NUMBER OF VIEWS |
|---|---|---|---|---|---|---|
| ***** | **** | USER A | ******* | 60min | 80min | 3 |
| | **** | USER B | ******* | 10min | | |
| | **** | USER C | ******* | 10min | | |
| ***** | **** | USER D | ******* | 30min | 90min | 4 |
| | **** | USER E | ******* | 10min | | |
| | **** | USER F | ******* | 20min | | |
| | **** | USER G | ******* | 30min | | |

FIG. 3

(DISTRIBUTION HISTORY DATA)                                                         ~52, 60

| USER ID (DISTRIBUTING USER) | DISTRIBUTION NUMBER | DISTRIBUTION DATE/TIME | DISTRIBUTION TIME | CUMULATIVE DISTRIBUTION TIME | CUMULATIVE NUMBER OF DISTRIBUTIONS |
|---|---|---|---|---|---|
| ***** | **** | ******* | 60min | 300min | 15 |
| | **** | ******* | 30min | | |
| | **** | ******* | 30min | | |
| | : | : | : | | |
| ***** | **** | ******* | 30min | 480min | 30 |
| | **** | ******* | 30min | | |
| | **** | ******* | 60min | | |
| | **** | ******* | 30min | | |
| | : | : | : | | |

FIG. 4

(GAME HISTORY DATA)                                      53, 60

| USER ID | GAME HISTORY | DATE/TIME |
|---------|--------------|-----------|
| * * * * * | GAME A | * * * * * * * |
|  | GAME B | * * * * * * * |
|  | GAME C | * * * * * * * |
| : | : | : |
| * * * * * | GAME B | * * * * * * * |
|  | GAME D | * * * * * * * |
| * * * * * | GAME B | * * * * * * * |
| * * * * * | GAME C | * * * * * * * |
|  | : | : |

FIG. 5

(FUNCTION HISTORY DATA)                                  54, 60

| USER ID | FUNCTION USAGE HISTORY | DATE/TIME |
|---------|------------------------|-----------|
| * * * * * * | PHOTOGRAPHING FUNCTION | * * * * * * |
|  | EMOTE FUNCTION | * * * * * * |
|  | GAME FUNCTION | * * * * * * |
| : | : | : |
| * * * * * * | PHOTOGRAPHING FUNCTION | * * * * * * |
| * * * * * * | : | * * * * * * |

FIG. 6

(LOTTERY HISTORY DATA)

55, 60

| LOTTERY ID | LOTTERY DATE/TIME | ITEM NAME |
|---|---|---|
| ✱✱✱ | ✱✱✱✱✱✱ | DRESS (RED) |
| | ✱✱✱✱✱✱ | SEASONAL FACE STICKER |
| ✱✱✱ | ✱✱✱✱✱✱ | T-SHIRT (BLACK) |
| | ✱✱✱✱✱✱ | SNEAKERS (BLUE) |
| ⋮ | ⋮ | ⋮ |

(MAIN BODY PARTS DATA)

~56

| AVATAR | MODEL | HEIGHT | SKIN COLOR | BODY SHAPE | MAIN BODY PARTS |
|---|---|---|---|---|---|
| 1 | F TYPE | ✱✱✱ | ✱✱✱ | ✱✱✱ | ✱✱✱ |
| 2 | M TYPE | ✱✱✱ | ✱✱✱ | ✱✱✱ | ✱✱✱ |
| 3 | F TYPE | ✱✱✱ | ✱✱✱ | ✱✱✱ | ✱✱✱ |

(ATTACHED PARTS DATA)                                                        57A

| PARTS ID | ITEM NAME | ATTRIBUTE | COLOR | APPLIED AVATAR NUMBER |
|---|---|---|---|---|
| ✱✱✱ | BEGINNER T-SHIRT | M TYPE | BLACK | 2 |
| ✱✱✱ | STAR COLORED CONTACTS | F TYPE | BLUE | 1 |
| ✱✱✱ | POINTED HAT | – | RED | 3 |
| ✱✱✱ | AUTUMN COLORS DRESS | F TYPE | PURPLE | 1 |
| ⋮ | ⋮ | ⋮ | ⋮ | |

(NON-ATTACHED PARTS DATA)                 57B

| PARTS ID | ITEM NAME | COLOR |
|---|---|---|
| ✱✱✱ | SUMMER NIGHT WALLPAPER | RED |
| ✱✱✱ | CHRISTMAS WALLPAPER | BLUE |
| ⋮ | ⋮ | ⋮ |

FIG. 9

(BANNER DISPLAY DATA)

58

| PARTS ID | SELECTION SCREEN | BANNER DISPLAY CONDITION | BANNER CONTENT | DISPLAY PERIOD |
|---|---|---|---|---|
| B**** | RECOMMENDED | DISTRIBUTION HISTORY ABSENT | DISTRIBUTION GUIDE | 12/1 ~ 12/31 |
| B**** | RECOMMENDED | DISTRIBUTION HISTORY PRESENT | EXPLANATION OF NEW FUNCTIONS | 12/1 ~ 12/31 |
| B**** | RECOMMENDED | — | NEW YEAR CAMPAIGN | 1/1 ~ 1/7 |
| ⋮ | ⋮ | ⋮ | ⋮ | ⋮ |
| B**** | GAME | NO PLAYING HISTORY FOR GAME A | GAME A | 11/15 ~ 11/30 |
| B**** | GAME | NO PLAYING HISTORY FOR GAME | EXPLANATION OF GAME FUNCTIONS | 11/15 ~ 11/30 |
| ⋮ | ⋮ | ⋮ | ⋮ | ⋮ |
| B**** | FOLLOW | CUMULATIVE VIEWING TIME < N HOURS | VIEWING ADVICE | 11/15 ~ 11/30 |
| B**** | FOLLOW | CUMULATIVE VIEWING TIME ≥ N HOURS | RANKING | 11/15 ~ 11/30 |
| ⋮ | ⋮ | ⋮ | ⋮ | ⋮ |
| B**** | FOLLOW | CUMULATIVE DISTRIBUTION TIME < M HOURS | DISTRIBUTION ADVICE | 11/15 ~ 11/30 |
| B**** | FOLLOW | CUMULATIVE DISTRIBUTION TIME ≥ M HOURS | ADVANCED FUNCTION GUIDE | 11/15 ~ 11/30 |
| ⋮ | ⋮ | ⋮ | ⋮ | ⋮ |

FIG. 10

(LOTTERY DATA) ~59

| LOTTERY ID | PARTS ID | ITEM NAME | MODEL | COLOR |
|---|---|---|---|---|
| ✱✱✱ | ✱✱✱ | DRESS | F TYPE | BLACK |
| | ✱✱✱ | DRESS | F TYPE | RED |
| | ✱✱✱ | SEASONAL FACE STICKER | – | BLUE |
| | ✱✱✱ | SEASONAL WALLPAPER | – | PURPLE |
| | ✱✱✱ | FEATHER | – | – |
| : | : | : | : | : |

| PARTS ID | REQUESTER | CONTENT | POSITION | DISPLAY PERIOD |
|---|---|---|---|---|
| B**** | USER F | XX EVENT TO BE HELD ON 12/25 | SIGNBOARD (X, Y, Z) | 12/1 ~ 12/25 |
| B**** | USER K | HAPPY BIRTHDAY | EVENT VENUE BACKGROUND | 12/1 ~ 12/1 |
| ⋮ | ⋮ | ⋮ | ⋮ | ⋮ |

~90

INFORMATION PROCESSING DEVICE, INFORMATION PROCESSING METHOD, AND PROGRAM FOR DISPLAYING BANNER BASED ON USER HISTORY DATA

This application claims the benefit of priority from Japanese Patent Application No. 2021-211973 filed Dec. 27, 2021, the entire contents of the prior applications being incorporated herein by reference.

TECHNICAL FIELD

This disclosure relates to an information processing device, an information processing method, and a program.

BACKGROUND ART

There is a known video distribution system that distributes video including animation of an avatar object that is based on movements of a distributing user (for example, see Patent Reference 1). A system has also been proposed in which a user's avatar can freely move in a virtual space, in addition to video distribution.

PATENT REFERENCE

[Patent Reference 1] JP Laid-Open Patent Application No. 2015-184689

SUMMARY

Problem to be Solved

The video distribution system may display a banner with a link that transitions to another website, or to another page within the same website. In most cases, the banner to be displayed is uniformly determined by an administrator who manages the display of the banner or a requester who asks the administrator to display the banner, according to a display period.

However, if the banner can be displayed according to the user, it is expected that opportunities for the user to select the banner and transition to a screen or the like associated with the banner will increase.

Means of Solving Problem

An information processing device that resolves the above-described problem comprises: a management portion that manages distribution of a video including animation of an avatar object corresponding to a user; a history recording portion that acquires history data showing a user's action history relating to distribution or viewing of the video from a user device used by the user, and records the history data to a memory; a history acquisition portion that acquires the history data of the user associated with a selection screen selected by the user, among the history data; a condition specifying portion that specifies each banner display condition corresponding to a plurality of banners associated with the selection screen; a determination portion that determines a condition that matches the acquired history data, out of the specified banner display conditions; and a banner selection portion that selects a banner corresponding to the banner display condition that matches the history data, out of the plurality of banners, and sends drawing data of the banner to the user device.

An information processing method that resolves the above-described problem is one in which one or a plurality of computers executes: a step of managing distribution of a video including animation of an avatar object corresponding to a user; a step of acquiring history data showing a user's action history relating to distribution or viewing of the videos from a user device used by the user, and recording the history data to a memory; a step of acquiring the history data of the user associated with a selection screen selected by the user, among the history data; a step of specifying each banner display condition corresponding to a plurality of banners associated with the selection screen; a step of determining a condition that matches the acquired history data, out of the specified banner display conditions; and a step of selecting a banner corresponding to the banner display condition that matches the history data, out of the plurality of banners, and sending drawing data of the banner to the user device.

A program for resolving the above-described problem causes one or a plurality of computers to execute: a step of sending to a server history data showing an action history of a user related to distribution or viewing of a video; a step of receiving from the server drawing data for banners associated with a plurality of selection screens selectable by the user that are banners for which a banner display condition matches the history data of the user, and recording the drawing data to a memory; and a step of displaying the banners on the selection screens using the drawing data received.

An information processing method that resolves the above-described problem is one in which one or a plurality of computers executes: a step of sending to a server history data showing an action history of a user related to distribution or viewing of a video; a step of receiving from the server drawing data for banners associated with a plurality of selection screens selectable by the user that are banners for which a banner display condition matches the history data of the user, and recording the drawing data to a memory; and a step of displaying the banners on the selection screens using the drawing data received.

Effects

With the present disclosure, it is possible to increase opportunities for a user to select a banner and transition to a screen or the like associated with the banner.

BRIEF EXPLANATION OF DRAWINGS

FIG. 3 is a diagram showing viewing history data of the same embodiment.

FIG. 4 is a diagram showing distribution history data of the same embodiment.

FIG. 5 is a diagram showing game history data of the same embodiment.

FIG. 6 is a diagram showing function history data of the same embodiment.

FIG. 9 is a diagram showing attached parts data and non-attached parts data of the same embodiment.

FIG. 10 is a diagram showing banner display data of the same embodiment.

MODES FOR IMPLEMENTING THE EMBODIMENTS

First Embodiment

Figures 1, 2:
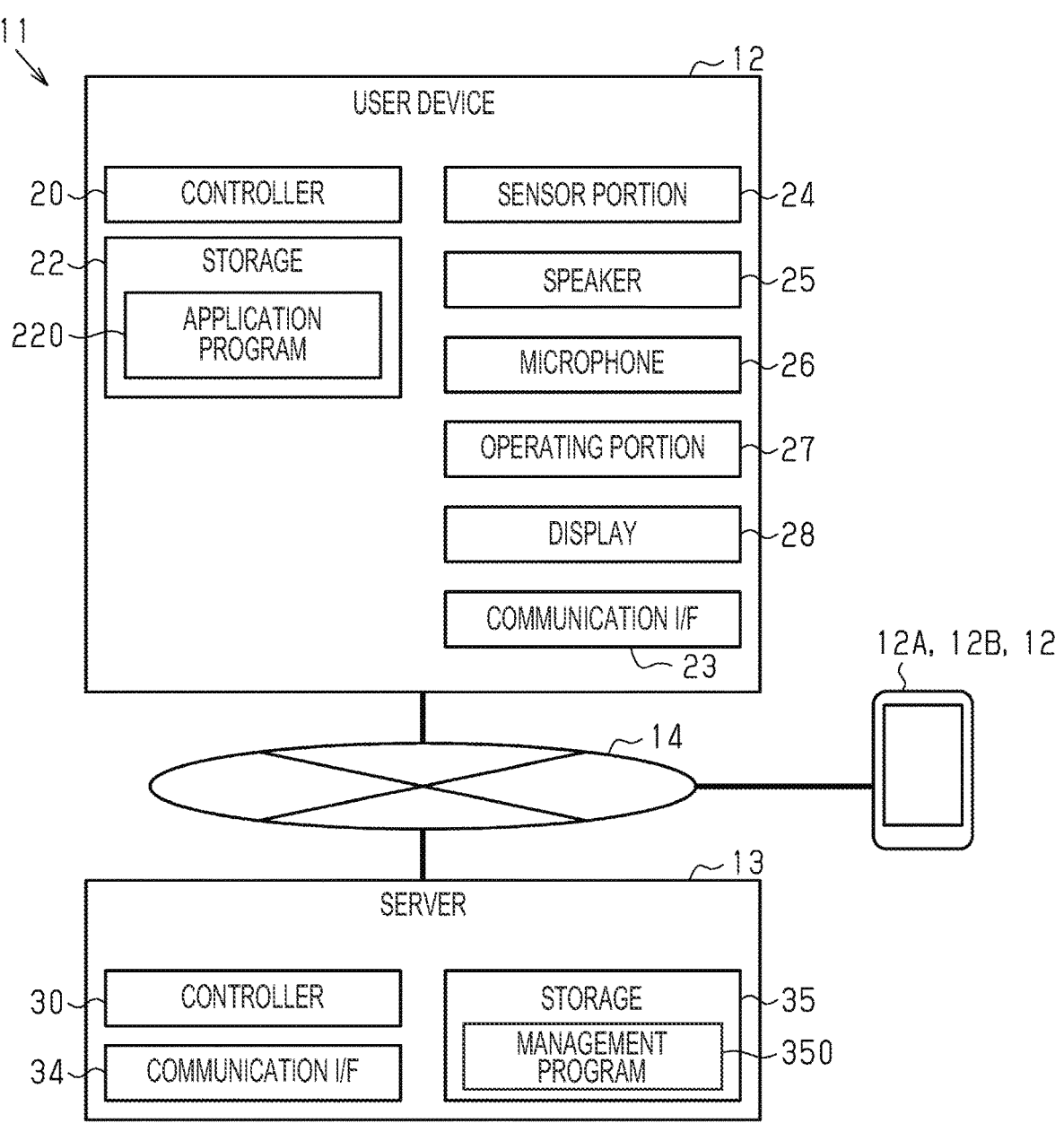
FIG. 1 is schematic view showing an embodiment of an information processing system in a first embodiment.
FIG. 2 is a diagram showing user management data of the same embodiment.

Hereinafter, a first embodiment of an information processing system, a program, an information processing method, a server and an information processing method of the server will be described.

The information processing system is a system that displays, on a user device used by the user, a virtual space image including an avatar object corresponding to the user and a banner that provides information to the user. The banner referred to here is an image displayed in a virtual space, and is displayed in an area visible to the user on a screen displaying information provided to the user by being selected by the user. Here, the information processing system will be described by taking as an example a system that distributes video, including an animation of an avatar object corresponding to a user, to a user device used by another user.

<Information Processing System>

An information processing system 11 will be described with reference to FIG. 1. The information processing system 11 includes a plurality of user devices 12 and a server 13. The user devices 12 and the server 13 send and receive data via a network 14. An application program 220 for viewing and distributing a video is installed on each user device 12. The application program 220 is a program installed on the user device 12. The user device 12 executes the application program 220 based on user input operations, and receives data necessary for distribution and viewing of the video from the server 13. The application program 220 may be a native application program in which a controller 20 directly performs arithmetic processing on an operating system, or may be a hybrid application that is written in a markup language such as HTML (Hyper Text Markup Language) or the like and displays a web page that uses CSS (Cascading Style Sheets), Java (registered trademark) or the like by an in-app browser.

A user who distributes a video using the application program 220 is called a distributing user, and a user who watches the distributed video is called a viewing user. Since the application program 220 executes the video distribution process and the video viewing process, the user can be both a distributing user and a viewing user. That is, the user is a viewing user when viewing video, and is a distributing user when distributing video. Further, a user device 12 used by a distributing user is referred to as a distributing user device 12A, and a user device 12 used by a viewing user is referred to as a viewing user device 12B. When not distinguishing between the distributing user and the viewing user, or between the distributing user device 12A and the viewing user device 12B, such will be referred to simply as the user and the user device 12.

The user device 12 is a smartphone (multifunctional telephone terminal), a tablet terminal, a personal computer, a game console, a wearable computer, or an information processing device other than these devices that is capable of reproducing videos. The wearable computer should be provided with a screen on which the user can watch a video, and is, for example, a head-mounted display worn on the user's head, a glasses-type wearable terminal, or the like. The user device 12 may be a device that operates independently, or may be composed of a plurality of devices that are connected to each other so as to be able to send and receive various data. As an example of the latter user device 12, there is, for example, a system that performs outside-in tracking.

The user device 12 includes the controller 20, a storage 22 (memory medium), and a communication interface (I/F) 23. The controller 20 includes one or a plurality of arithmetic circuits such as a CPU (Central Processing Unit), a GPU (Graphics Processing Unit), an NPU (Neural network Processing Unit) or the like. Further, the controller 20 includes a memory which is a main memory device (memory medium) on which the arithmetic circuit can read and write. The memory is composed of a semiconductor memory or the like. The controller 20 reads the operating system and other programs from the storage 22 or an external storage into the memory, and executes instructions retrieved from the memory. The communication I/F 23 can send data to and receive data from the server 13 and other user devices 12 via the network 14. The network 14 includes various networks such as a local area network, the Internet, or the like.

The storage 22 is an auxiliary memory device (memory medium), and is, for example, a memory medium such as a magnetic disk, an optical disk, a semiconductor memory, or the like. For the storage 22, a plurality of storages can also be used in combination. The application program 220 is stored in the storage 22. The storage 22 corresponds to a memory portion.

The controller 20 executes various processes related to video distribution and various processes related to viewing by executing the application program 220. Then, based on the user's input operation to the operation portion 27, videos are distributed and videos are viewed. Hereinafter, for convenience of explanation, a state in which a video is distributed is referred to as a distribution mode, and a state in which a video distributed by another distributing user is viewed is referred to as a viewing mode.

Further, the user device 12 includes a sensor portion 24, a speaker 25, a microphone 26, an operation portion 27 as an input operation portion, and a display 28. At least one of the sensor portion 24, the speaker 25, the microphone 26, the operation portion 27, and the display 28 may be provided as the same device as the controller 20, or may be provided in a state of being connected to the controller 20.

The sensor portion 24 is one or a plurality of sensors that detect a facial motion indicating a change in the facial expression of the user and a body motion indicating a change in the relative position of the user's body with respect to the sensor portion 24. Facial motion includes movements such as blinking and opening and closing of the mouth. A known device can be used the sensor portion 24. Examples of the sensor portion 24 include a ToF sensor that measures and detects the time of flight until light emitted toward the user is reflected on the user's face and returns, a camera that captures the user's face, and an image processor that processes data captured by the camera. Further, the sensor portion 24 may include an RGB camera that captures visible light and a near-infrared camera that captures near-infrared rays. For the RGB camera and the near-infrared camera, for example, "True Depth" on the "iPhone X (registered trademark)" or "LIDAR" (Light Detection and Ranging, or Laser Imaging Detection and Ranging) on the "iPad Pro (registered trademark)" or the like, or other ToF sensors mounted on smartphones, can be used. Specifically, this camera projects tens of thousands of invisible dots (points) on the user's face or the like by a dot projector. Then, the reflected light of the dot pattern is detected and analyzed, a depth map of the face is formed and an infrared image of the face or the like is captured to capture accurate face data. The arithmetic processor of the sensor portion 24 generates various items of information based on the depth map and the infrared image, compares the information with registered reference data, and calculates the depth of each point of the face (the distance between each point and the near-infrared camera) and deviations in positions other than depth.

Further, the sensor portion 24 may have a function of tracking not only the user's face but also the hands (hand tracking). Further, the sensor portion 24 may include a sensor that detects the position or orientation of a human body part other than the hands. The sensor portion 24 may further include a sensor such as an acceleration sensor that detects speed and/or acceleration, and a sensor such as a gyro sensor that detects direction and/or orientation. The sensor portion 24 may have a spatial mapping function that recognizes an object in the real space in which the user exists based on the detection results of the ToF sensor and/or other known sensors, and maps the recognized object to a spatial map. Hereinafter, when the facial motion detection data and the body motion detection data are described without particular distinction, such will be simply referred to as "tracking data". The image processor of the sensor portion 24 may be provided by the controller 20.

The speaker 25 converts audio data into audio and outputs such. The microphone 26 inputs audio spoken by the user and converts such into audio data. The display 28 outputs various images in response to output instructions from the controller 20.

As the operation portion 27, a device corresponding to the type of user device 12 can be used. An example of the operation portion 27 is a touch panel integrated with the display 28. Further, other examples of the operation portion 27 are an operation button provided in the housing of the user device 12, a keyboard, a mouse, a controller the user operates by hand, or the like. The controller may incorporate various known sensors such as an acceleration sensor or an inertial measurement sensor (IMU: Inertial Measurement Unit) such as a gyro or the like. Further, another example of the operation portion 27 may be a tracking device that specifies the movement of the user's hands, the movement of the eyes, the movement of the head, the direction of the line of sight, and the like. In this aspect, for example, the user's instructions may be determined based on the movement of the user's hands, and video distribution can be started or stopped, or various operations can be executed such as the display of a message, an evaluation of the video, or the display of a predetermined object (for example, the below-described gift). If the sensor portion 24 also has an input interface function such as a hand tracking function, the operation portion 27 can be omitted.

<Server>

Next, the server 13 will be described. The server 13 is used by a service provider or the like that provides a service for distributing videos. The server 13 includes a controller 30, a communication I/F 34, and a storage 35. The controller 30 has one or a plurality of arithmetic circuits. The controller 30 has the same configuration as the controller 20 of the user device 12. Further, the communication I/F 34 and the storage 35 have the same configurations as in the user device 12. The server 13 may be composed of one device or may be composed of a plurality of devices. When the server 13 is composed of a plurality of devices, those devices are provided in a distributed manner with the functions of the controller 30 and various data stored in the storage 35.

The storage 35 stores a management program 350. Further, the storage 35 stores various historical data indicating the user's action history in the application. In addition, the storage 35 stores drawing data and other attribute data that serve as masters for drawing the main body parts for drawing the avatar main body, attached parts attached to the avatar main body, and non-attached parts other than the attached parts. Further, the storage 35 stores data that serves as a master for drawing various objects. The storage 35 corresponds to a memory section and a lottery target memory section.

(Data Structures)

Next, examples of the configuration of the data stored in the storage 35 of the server 13 will be described in detail with reference to FIG. 2 through FIG. 10.

The storage 35 stores user management data 50, viewing history data 51, distribution history data 52, game history data 53, function history data 54, and lottery history data 55. The user management data 50, viewing history data 51, distribution history data 52, game history data 53, function history data 54, and lottery history data 55 are history data 60 indicating a user's action history. The history data 60 is log data indicating the user's actions in the application. Further, as data related to the avatar, the storage 35 stores main body parts data 56, attached parts data 57A, and non-attached parts data 57B. Further, the storage 35 stores banner display data 58 as information regarding a banner to be displayed in the virtual space. Further, the storage 35 stores lottery data 59 for running a lottery.

FIG. 2 shows an example of the user management data 50. The user management data 50 is data related to each user. The user management data 50 includes user IDs that are user identification information, coin data, and point data. A coin is a medium that can be purchased by a user and can be used in the video distribution service. Points are media that can be obtained by watching a video, distributing a video, selling an item, or the like, and can be used in the video distribution service. The user management data 50 may also include an ID associated with an application for performing push notifications, an email address, and the like.

FIG. 3 shows an example of the viewing history data 51. The viewing history data 51 is data indicating the viewing history of each user. The viewing history data 51 includes a history generated for one cycle of viewing and statistical information of that history. One-cycle of viewing refers to the period from the start to the end of viewing one video distributed by a distributing user. The viewing history data 51 includes a distribution number, a user ID of the distributing user, a viewing date and time, a viewing time, a cumulative viewing time, and a cumulative number of viewings, all in association with the user ID of the viewing user. The distribution number is a number assigned to the video viewed by the user. The user ID of the distributing user indicates the user ID of the distributing user who distributed the video. The viewing date and time indicates the date and time of the viewing. The viewing time indicates the length of the viewing time. The cumulative viewing time is the total viewing time of videos from the time when the viewing user logged in for the first time or when the viewing user registered as a user. The cumulative number of viewings is the total number of viewings from the time when the viewing user logged in for the first time or when the viewing user registered as a user. The cumulative viewing time may be the total of the viewing times for each distributing user. Further, the cumulative number of views may be the total of the number of views for each distributing user. For example, when a user associated with the viewing history data 51 views a video distributed by the "distributing user A" twice for one hour each time, "distributing user A" is associated with the cumulative viewing time of "120 minutes". Alternatively, "distributing user A" is associated with the cumulative number of views of "2". Further, when the user views a video distributed by the "distributing user B" three times for 30 minutes each time in addition to the video of the "distributing user A", "distributing user B" is associated with the cumulative viewing time of "90 minutes". Alternatively, "distributing user B" is associated with the cumulative number of views of "3".

Further, the viewing history data 51 may include a history related to a gift object. The gift object is an object displayed in the virtual space, and is an object provided by the viewing user to the distributing user who distributes the video. The gift object may be one for which a display request can be made without paying a price, or one for which a display request can be made by paying a price. Alternatively, the gift object may be one for which a price is paid when a display is made in response to a display request. When the gift object is displayed in the video, a value corresponding to the type of the gift object may be added to the point value or the coin value of the user management data 50 of the distributing user. When the viewing history data 51 includes a history related to the gift object, the information in this history includes the identification information of the video for which the display request is made, or the user ID of the distributing user who distributed the video. Also, historical information about the gift object may include the type, number, time of the display, or time when the display request was sent for the gift object. In this manner, the relationship between the user associated with the viewing history data 51 and the distributing user can be identified, and it can be determined whether or not the user is a fan of the distributing user.

FIG. 4 shows an example of the distribution history data 52. The distribution history data 52 is data indicating the distribution history of each user's videos. The distribution history data 52 includes a history generated for one cycle of distribution, and statistical information of that history. The distribution history data 52 includes a distribution number, a distribution date and time, a distribution time, a cumulative distribution time, and a cumulative number of distributions in association with the user ID of the distributing user. The distribution number is a number assigned to the video. The distribution date and time indicates the date and time of distribution by the distributing user. The distribution time indicates the length of time that the distributing user has distributed the video. The cumulative distribution time is the total distribution time from the time when the distributing user logged in for the first time or registered as a user. The cumulative number of distributions is the total number of distributions by the distributing user since the distributing user logged in for the first time or registered as a user. The distribution history data 52 may include the user ID of a viewing user who has requested the display of a gift object. The user ID of the viewing user may be associated with the distribution number of the video. Alternatively, the distribution history data 52 may include the user ID of the viewing user who sent a display request for a gift object in association with the user ID of the distributing user, and the number of times the viewing user makes display requests for the gift object.

FIG. 5 is an example of the game history data 53. The information processing system 11 can distribute a video in which a plurality of users plays a game at the same time. A plurality of playable games is prepared. The game history data 53 includes a game history and a date and time, which are game distribution history data, in association with the user ID. The game history is identification information such as the name of the game played. The date and time include the time when the game is started and the time when the game is ended. Further, the game history data 53 may include game progress data. The progress data includes at least one of the score obtained in the game, wins and losses, the opponent, the number of times the game is played, and rewards obtained in the game. Rewards are, for example, game media such as points and coins that can be used in the video distribution service, or items or characters that can be used in the game.

FIG. 6 is an example of the function history data 54 of a production function. The server 13 executes a production process for expressing a predetermined function based on the user's operation during distribution or viewing of a video based on the user's input operation. The function history data 54 includes the usage history and the date and time of the production function of the application in association with the user ID. The usage history indicates a production function used by the user, or alternatively, may indicate a production function that the user has not yet used. The date and time are a new date and time at which a production function is used based on the user's operation. Further, the function history data 54 may include the number of times the production function is used.

An example of the production function is, for example, a photographing function. The photographing function is one which, when the distributing user performs a predetermined operation on the user device 12, accomplishes a process (photographing process) of photographing (capturing) an avatar object with a camera in the virtual space and saving the image data obtained by the photographing in the storage 35.

Another example of the production function is an emote function. The emote function is one of the processes that can be executed by the application program 220, and is a component associated with various layers of parts such as the hands, arms, and head of the avatar object. When the user device 12 applies the component to the avatar object, the avatar object performs actions such as "applause", "waving", "joining hands", and "toasting". For example, "waving" is associated with a waving animation in the hierarchy of the "right hand" of the avatar object. Further, avatar attributes of the avatar object may be set as the application target of the emote function.

Furthermore, another example of the production function is a game distribution function. Alternatively, this production function is also referred to as a game live streaming function. The game distribution function is a function for executing a game in which a predetermined number of users can participate, and distributing a video of the execution status of the game. When the game distribution function is executed, the history of the users who participated in the game is added to the game history data 53.

Figures 7, 8:
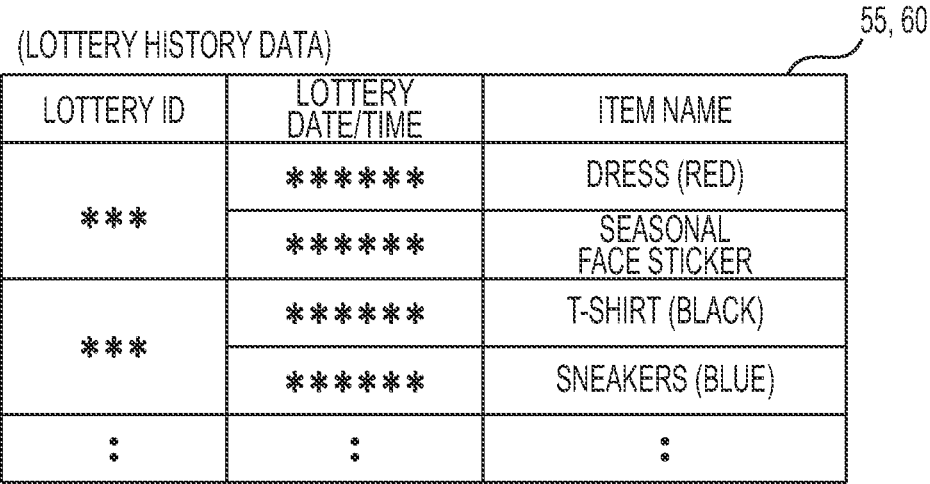
FIG. 7 is a diagram showing lottery history data of the same embodiment.
FIG. 8 is a diagram showing main body data of the same embodiment.

FIG. 7 is the lottery history data 55. The lottery history data 55 shows the history of the server 13 executing a lottery based on the input operation of the user. The lottery history data 55 includes a lottery ID, a lottery date and time, and an item name. The lottery ID is identification information of a lottery (gacha) selected by the user. Within the application, each of the lottery themes is associated with a lottery population that includes a plurality of lottery targets. The lottery target is, for example, a part applied to an avatar object. Alternatively, the lottery target is something other than an object, such as the emote function applied to the avatar object or audio that can be output in a video. Alternatively, the lottery target is not applied to the avatar object, but is a production of launching fireworks in the virtual space, a production of breaking a Kusudama, or non-attached parts such as a banner or a hanging scroll displayed in the virtual space, or the like. The lottery date and time is the date and time when the lottery was executed. The item name is the name of an object or the like associated with the user. The lottery history data 55 may include identification information of the lottery target instead of the item name.

Next, the main body parts data 56, the attached parts data 57A, and the non-attached parts data 57B will be described with reference to FIG. 8 to FIG. 10. These data are data related to the registered parts associated with the user and stored in the server 13. Depending on the video distribution method, the data of the registered parts may be stored in the user device 12 in addition to the server 13.

Registered parts are parts that can be used by the user at any time. The registered parts include parts that the user has paid for and acquired, parts that do not require payment, and parts that have been acquired by lottery. The drawing data for drawing the parts is three-dimensional model data, and includes polygon data, skeleton data (bones), texture data, and the like. A part of the drawing data of the main body parts, the attached parts, and the non-attached parts is stored in the user device 12 in accordance with the video distribution method.

FIG. 8 is an example of the main body parts data 56. The main body parts will be explained. The main body parts are parts that make up the avatar object. Data for drawing the main body parts includes polygon data, skeleton data (bones) for expressing the movement of the avatar object, texture data, and the like. A part of the main body parts can be arbitrarily set by the user. For example, the avatar attribute is associated with the main body parts. The avatar attribute is, for example, a model of a female type such as "F type" or the like, or a male type such as "M type" or the like. The skeleton data, polygon data, and so forth of the avatar object differ depending on the avatar attribute. In addition, the attached parts that can be applied to the avatar object differ depending on the attribute of the avatar object.

In addition to "F type" and "M type", "adult", "child", and character type may be set as the avatar attribute. In this embodiment, each user can register three avatar objects as avatars that can be used by the user. The main body parts data 56 includes data for drawing at least one but not more than three avatar object main bodies.

The main body parts data 56 shown in FIG. 8 includes information on the avatar number, model, height, skin color, body shape, and main body parts. The number is the registration number of the avatar object. The model is a model such as "F type" or "M type". Height, skin color, and body shape indicate attributes of the main body parts. For example, "height" is associated with "tall", skin color is associated with "brown", and body shape is associated with "thin". The main body parts are parts of an avatar object that can be selected by the user, and include, for example, a part ID such as an eye, a mouth, and a hairstyle. The main body parts may include one part ID or may include a plurality of part IDs.

FIG. 9 shows an example of the attached parts data 57A. The attached parts are parts applied to a predetermined part of the avatar object. The attached parts are, for example, "tops" applied to the upper body, "shoes" applied to the legs, "skirts" applied to the lower body, and the like. The user selects favorite attached parts from a plurality of attached parts according to the avatar attribute of the avatar object. Attribute data indicating the part of the avatar object is associated with the attached parts. In addition to the clothes of the avatar object, the attached parts may be ones associated with a predetermined part of the avatar object, such as a "cup", a "mug", an "umbrella", and a "musical instrument". For example, the "cup" is associated with the hand part of the avatar object, and the avatar object holding the "cup" can be displayed by applying the "cup" part.

The attached parts data 57A includes a part ID, an item name, an attribute, a color, and an applied avatar number. The part ID is identification information of the registered part. The item name is the name of the part. For example, the names of items such as "beginner T-shirt" are stored. The attribute is an attribute of the avatar to which the attached parts are applied, and "M type" or "F type" is set. The color indicates the color of the attached parts. The applied avatar number indicates the registration number of the avatar object to which the attached parts are applied, among the avatar objects registered by the user.

FIG. 9 shows an example of the non-attached parts data 57B. The non-attached parts are objects such as wallpaper displayed in the background of the avatar object. The non-attached parts include a part ID, item name, and color for each non-attached part. The non-attached parts may be registered in association with the avatar object to which such are to be applied.

FIG. 10 is an example of the banner display data 58. The banner display data 58 is information about a banner to be displayed in the virtual space. The banner display data 58 includes a banner ID, a selection screen indicating a screen to be displayed, banner display condition, banner contents, and a display period.

The banner ID is a number assigned to the banner to be displayed. The selection screen shows identification information for the screen that displays the banner. In other words, the banner and the selection screen are associated. On the application screen, a plurality of selection screens can be displayed based on the input operation of the user. The application screen includes a GUI that can switch the selection screen, and in the present embodiment, this GUI is a tab associated with the selection screen. When the user selects the tab, the controller 20 displays a selection screen corresponding to the tab. One or a plurality of banners are associated with the selection screen.

The banner display condition is a condition for displaying the banner. The banner display condition is a condition related to the user's action history in the application. For example, the banner display condition is the presence or absence of a distribution history, the presence or absence of a game play history, whether or not the cumulative viewing time is a predetermined time or longer, whether or not the cumulative distribution time is a predetermined time or longer, or the like. When a plurality of banners is associated with the selection screen selected by the user, the server 13 selects a banner for which the action history of the user satisfies the banner display condition, based on the history data of the user.

The banner contents include the information displayed on the banner, the color of the banner, or the size of the banner. The display period indicates the period for displaying the banner. When the display period is finite, the display period is a period such as "Dec. 1, 2021 to Dec. 31, 2021". If the display period is not finite and the start of the display and the end of the display are determined by the registrant's instructions, the display period information need not include the period.

Figures 11, 12:
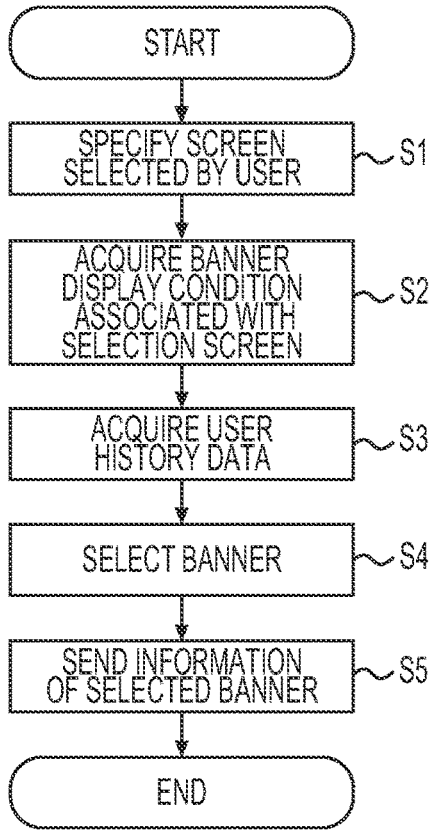
FIG. 11 is a diagram showing lottery data of the same embodiment.
FIG. 12 is a flowchart showing a procedure for banner display processing of the same embodiment.

FIG. 11 shows an example of the lottery data 59. The lottery data 59 is data for the server 13 to execute the lottery. The lottery data 59 includes data about each of the lottery target groups (population). The lottery target groups include a plurality of lottery targets. The server 13 uses the lottery data 59 to select a lottery target group designated by the user from the plurality of lottery target groups (population). Further, the server 13 selects a predetermined number of lottery targets from the selected lottery target group according to a predetermined lottery method based on a set lottery probability. For example, a lottery target group is set for each theme such as "Yusuzumi gacha" and "Yozora gacha", and each of the lottery target groups includes parts according to the set theme.

The lottery data 59 shown in FIG. 11 is an example in which a plurality of parts applied to the avatar object are included in the lottery target group. The lottery data 59 includes a lottery ID, a part ID, an item name, a model, and color information. The lottery ID is identification information assigned to the lottery target group. The part ID is identification information assigned to the part to be drawn. The item name is the name of the part to be drawn. The model is the model of the avatar object to which the part to be drawn is applied. The color is the color of the part to be drawn. In addition to the parts to be drawn, the lottery data 59 may include information on emote functions.

<User Device Processing>

Next, a portion of the processing executed by the user device 12 executing the application program 220 will be described.

(Video Distribution Process and Viewing Process)

As the video distribution method, one out of a client rendering method, a video distribution method, a server distribution method, and a browser rendering method can be used.

The client rendering method is a method in which the distributing user device 12A and the viewing user device 12B acquire the video configuration data necessary for generating a video, and generate a video.

The video distribution method is a method in which the distributing user device 12A generates video data, and the viewing user device 12B displays the video on the display 28 based on the video data received from the distributing user device 12A. Specifically, the distributing user device 12A generates video data using tracking data or the like. Further, the distributing user device 12A sends encoded video data and audio data to the server 13. The server 13 sends the video data and the audio data to the viewing user device 12B. At this time, when the server 13 receives a message or a gift object display request sent from the viewing user device 12B, the server 13 may send the message display data, the gift object identification information, or the like, to the viewing user device 12B and the distributing user device 12A. The viewing user device 12B displays a video based on the data received from the server 13. The distributing user device 12A displays the video using the tracking data, the display data of the message received from the server 13, or the like.

The server distribution method is a method in which the server 13 generates video data. The server 13 receives tracking data and audio data from the distributing user device 12A, receives a gift object display request, a message or the like from the viewing user device 12B, and generates video data based on those data. The server 13 sends the generated video data to the distributing user device 12A and the viewing user device 12B. The distributing user device 12A and the viewing user device 12B display video based on the received video data.

The browser rendering method is a method in which the distributing user device 12A and the viewing user device 12B draw a video using a web browser program stored in the storage 22. At this time, the distributing user device 12A sends tracking data and the like to the server 13. The user device 12 downloads from the server 13 a web page that is described in a markup language such as HTML (Hyper Text Markup Language), and uses CSS (Cascading Style Sheets), Javascript (registered trademark), or the like. The web browser program activated by the user device 12 draws an avatar object and other objects by Javascript running on the browser. In the browser rendering method, the user device 12 stores the data received from the server 13 in volatile memory, and stores the URL of the web page for displaying the video and the like in non-volatile memory. Therefore, the drawing data of the avatar object is not stored in the user device 12. The distributing user device 12A may display the video by the client rendering method, and the viewing user device 12B may display the video by the browser rendering method. Alternatively, the distributing user device 12A may display the video by the browser rendering method, and the viewing user device 12B may display the video by the client rendering method.

In this embodiment, a method of distributing a video by the client rendering method will be described. It should be noted that a hybrid system in which the viewing user device 12B performs part of image processing using the video data generated by the distributing user device 12A may be used, or another video distribution method may be used.

In the client rendering method, the controller 20 of the distributing user device 12A and the controller 20 of the viewing user device 12B each generate animation by applying the tracking data acquired from the sensor portion 24 to the avatar object in the distribution mode. Further, the controller 20 renders the avatar object and objects other than the avatar object. Rendering here refers to a drawing process that includes acquisition of the position of a virtual camera, perspective projection, hidden surface erasure (rasterization), and the like. Rendering may be at least one of these processes, and may include processes such as shading and texture mapping.

The controller 20 generates animation using the rendered image. Further, the controller 20 outputs to the display 28 video data in which the animation is combined with a posted message sent from the viewing user device 12B, a notification sent from the server 13, or the like. Further, the controller 20 outputs audio data from the speaker 25 in synchronization with the video data.

In the distribution mode, the controller 20 performs a distribution process. In the distribution process, the part IDs of the main body parts and the attached parts of an avatar object that distributes the video are sent to the server 13. Further, the controller 20 sends the tracking data and the audio data to the server 13. Further, the controller 20 generates an image including an avatar object corresponding to the distributing user himself and displays such on the display 28.

In the viewing mode, the controller 20 performs a viewing process. In the viewing process, the identification information of the video selected by the user is sent to the server 13 and distribution of the video is requested. Further, the controller 20 receives the part IDs of the main body parts and the attached parts of the avatar object included in the requested video from the server 13. Further, the controller 20 receives the tracking data and the audio data from the server 13. Further, the controller 20 generates an image including an avatar object corresponding to the distributing user and displays such on the display 28. Further, based on the viewing user's operations, the controller 20 performs sending of gift object display requests, posting of messages related to the video, and evaluation of the video (selection of a "like" button or a "favorite" button, or the like).

(Banner Display Process)

The controller 20 sends various history data 60 indicating an action history related to video distribution or viewing to the server 13. Further, the controller 20 sends the identification information of the selection screen selected by the user to the server 13. Further, the controller 20 receives from the server 13 the drawing data of a banner selected by the server 13 from among the plurality of banners associated with the selection screen. This banner is a banner whose banner display conditions match the user's history data 60. Further, the controller 20 displays the banner on the selection screen using the drawing data received.

The controller 20 may send identification information of the selection screen to the server 13 when the selection screen is specified. Upon receiving the identification information of the selection screen, the server 13 selects a banner corresponding to the banner display conditions that match the user's history data from the plurality of banners associated with the selection screen. Then, the server 13 sends the drawing data of the selected banner to the user device 12.

<Server Process>

Next, a part of the process executed by the server 13 executing the management program 350 will be described.

(Distribution Management Process)

The controller 30 of the server 13 performs a lottery process. In the lottery process, a lottery target group designated by the user and a lottery execution request from the lottery target group are received from the user device 12. Further, the controller 30 draws a predetermined number of lottery targets from the lottery target group designated by the user. Further, the controller 30 sends data regarding the lottery targets to the user device 12.

Further, the controller 30 performs a distribution management process. Specifically, the controller 30 sends a list of videos being distributed in response to a request from the viewing user device 12B. The controller 30 receives the identification information of a video selected from the list from the viewing user device 12B. Further, the controller 30 sends tracking data or the like, acquired from the distributing user device 12A that distributes the selected video, to the viewing user device 12B. Further, the controller 30 receives a posted message or the like posted by the viewing user for the video being distributed. Further, the controller 30 sends the received posted message to the distributing user device 12A and the viewing user device 12B. The posted message includes the content of the message, identification information of the viewing user (user's account name, and the like), posting date and time, and the like. In addition, a message displayed in the video includes a notification message of "User A has entered the room".

Further, in the distribution management process, the controller 30 receives from the viewing user device 12B a request a displaying the gift object on the video being viewed. The controller 30 sends a gift object display request together with the identification information of the gift object to the distributing user device 12A and the viewing user device 12B. When the gift object display request is received by the server 13, or when a predetermined operation is accomplished by the distributing user with respect to the display request, the server 13 sends a notification of "User B gave fireworks" at a predetermined timing to the distributing user device 12A and the viewing user device 12B.

In addition, the controller 30 performs a purchase process. Specifically, in accordance with the user's operation, the purchase process of a purchase target such as the parts specified by the user and the purchase process of a lottery are performed. The purchase process includes a process of paying a price (medium) for coins, points, tickets, and the like, that can be used in the application program. For example, points can be obtained by distributing a video and watching a video. In addition, the purchase process may include the process of exchanging, selling, or transferring parts. The purchase process stores the purchased parts as registered parts in at least one of the user device 12 and the server 13 in association with the user. Earnings from parts that can be purchased are distributed, for example, to distributing users and service providers.

(Banner Selection Process)

The controller 30 functions as a management portion, a history recording portion, a history acquisition portion, a condition specifying portion, a determination portion, a banner selection portion, a lottery execution portion, and a target recording portion. These may be distributed to a plurality of computers. The management portion acquires the history data 60 indicating the user's action history regarding the distribution or viewing of videos from the user device 12 and records such in the storage 35. The history recording portion acquires the history data of the user associated with the selection screen selected by the user from among the history data 60. The condition specifying portion specifies each banner display condition corresponding to a plurality of banners associated with the specified selection screen. The determination portion determines, among the specified banner display conditions, a condition that matches the acquired history data 60. The banner selection portion selects a banner corresponding to the banner display condition that matches the history data from the plurality of banners, and sends the drawing data of the banner to the user device 12.

(Operation)

Procedures of the process in which the server 13 selects the banner will be described with reference to FIG. 12. In this embodiment, the banner is displayed on a screen that the user visually recognizes, at a time other than video distribution or video viewing.

The user device 12 displays an application screen including a plurality of tabs on the display 28 by executing the application program 220. Tabs correspond to categories within the application such as "Recommended" and "Games". The user selects one of the plurality of tabs displayed on the application screen. When a tab is selected by the user, the user device 12 sends the identification information and the user ID of the selected tab to the server 13.

The controller 30 of the server 13 identifies the selection screen selected by the user based on the identification information received (step S1). The controller 30 specifies, for example, a selection screen such as "Recommended" or "Games".

The controller 30 acquires the banner display condition associated with each selection screen (step S2). Specifically, the controller 30 acquires the display condition of the banner associated with the specified selection screen, and the date and time of acquiring the banner display condition is included in the display period.

Next, the controller 30 acquires the history data of the user corresponding to the user ID received (step S3). At this time, the controller 30 acquires the history data corresponding to the acquired banner display condition. For example, when the specified selection screen is the "Recommended" screen and the banner display condition associated with the "Recommended" selection screen is a condition related to the viewing history, the user's viewing history data 51 is acquired. When the specified selection screen is the "Games" screen and the banner display condition associated with the "Games" selection screen is a condition related to the game history, the user's game history data 53 is acquired.

The controller 30 compares the acquired display condition with the history data 60 and selects a banner that matches the history data 60 (step S4). Specifically, the controller 30 selects a banner whose banner display condition is satisfied by the acquired history data 60. When a plurality of banner display conditions is satisfied, a banner that is close to the end date and time of the display period may be selected, or a banner may be selected according to a preset priority. Then, the controller 30 reads the drawing data of the banner associated with the banner ID of the selected banner from the storage 35.

Further, the controller 30 sends drawing data or the like, which is information on the selected banner, to the user device 12 (step S5). The controller 30 sends the image of the selected banner to the user device 12. For example, when the application program 220 displays the selection screen on the in-app browser, banner drawing data or the like is sent to the user device 12 in association with web data displaying the specified selection screen. The user device 12 displays the banner at a predetermined position on the selection screen using the web data and drawing data received.

The server 13 may select banners associated with each selection screen based on the history data 60 when the user starts the application program 220, and may send the banners to the user device 12 all at once. In this case, the user device 12 may select and display a banner image from among the banner images received from the server 13 in accordance with the user's tab selection.

(Selection Screen)

Screens displayed on the user device 12 will be described with reference to FIG. 13 to FIG. 17.

Figure 13:
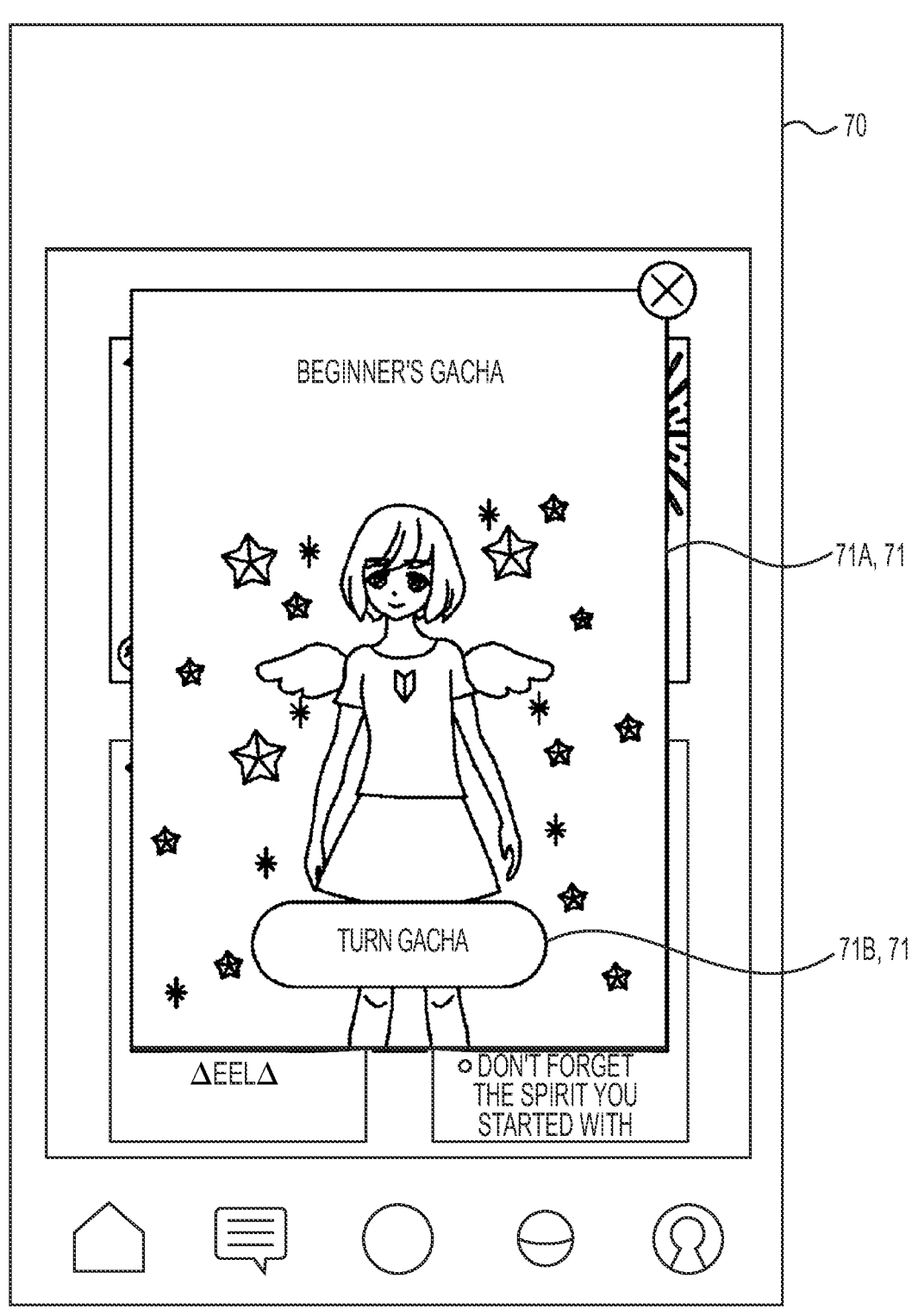
FIG. 13 is a diagram showing a startup screen in the same embodiment.

FIG. 13 is a notification screen 70 for when the application program 220 is started. A banner 71 is associated with the notification screen 70 as a selection screen. The banner 71 shown in FIG. 13 includes a guidance screen 71A on which guidance information regarding a lottery is displayed, and a lottery execution button 71B.

The fact that the user does not have parts that can be selected in a predetermined lottery (first banner display condition), and the fact that the user has at least one part that can be selected in a predetermined lottery (second banner display condition) are associated with the notification screen 70. For example, the banner corresponding to the first banner display condition is a banner of a lottery in which a predetermined part such as a part for beginners or a part required at the initial stage are included in the lottery target group. For example, the banner corresponding to the second banner display condition is a banner of a lottery that can be executed only for a certain period of time, such as a seasonal lottery. The lottery corresponding to the second banner display condition includes a new part that was not provided to the user before the lottery became executable.

The controller 30 of the server 13 compares the lottery data 59 with the main body parts data 56, the attached parts data 57A, and the non-attached parts data 57B associated with the user, and determines whether or not each part ID of the parts included in the lottery data 59 is included in the main body parts data 56, the attached parts data 57A, and the non-attached parts data 57B associated with the user. When the controller 30 determines that each part ID of the parts included in the lottery data 59 is not included in the main body parts data 56, the attached parts data 57A, and the non-attached parts data 57B associated with the user, it is determined that the first banner display condition is satisfied, and the image of a banner corresponding to the first banner display condition is sent to the user device 12 and displayed. On the other hand, when the controller 30 determines that each part ID of the parts included in the lottery data 59 is included in the main body parts data 56, the attached parts data 57A, and the non-attached parts data 57B associated with the user, it is determined that the second banner display condition is satisfied, and the image of a banner corresponding to the second banner display condition is sent to the user device 12 and displayed.

The display position of the banner 71 is a predetermined position on each screen. In the example of FIG. 13, the user device 12 displays the guidance screen 71A and the lottery execution button 71B overlaid on the notification screen 70. The guidance screen 71A is a banner related to a lottery of parts for beginners.

When the user selects the lottery execution button 71B, the user device 12 acquires data for displaying the screen of a link associated with the banner 71 and outputs the data to the display 28. As a result, another screen for executing the lottery is displayed on the display 28.

Alternatively, the notification screen 70 may be associated with conditions relating to a registration period. The banner display conditions associated with the notification screen 70 are that (i) a registration period that is the number of days that have passed since the first login to the server 13, or a registration period that is the number of days that have passed since the user registration, is not more than a predetermined number of days (third banner display condition) and (ii) the registration period exceeds a predetermined number of days (fourth banner display condition). Different banners 71 are associated with these banner display conditions. For example, the banner corresponding to the third banner display condition is a banner for guidance for beginners. For example, the banner corresponding to the fourth banner display condition is a banner related to new information about the application.

Figure 14:
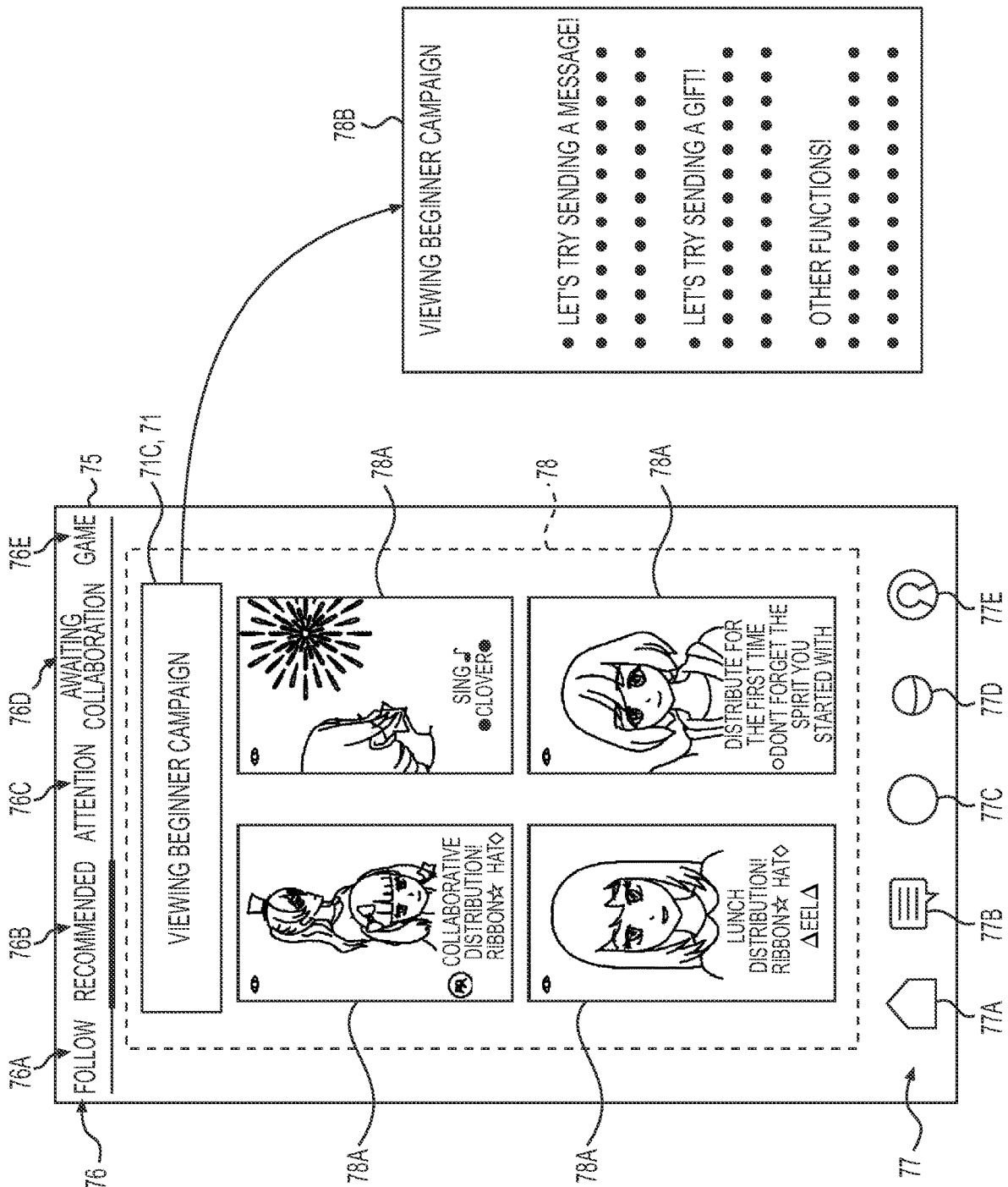
FIG. 14 is a diagram showing an application screen in the same embodiment.

FIG. 14 shows an application screen 75 displayed after startup. The application screen 75 includes a plurality of tabs 76 and icons 77 included in the frame of the application screen 75, and selection screens 78 associated with each of the tabs 76. For the icons 77, a home button 77A for returning to the home screen, a notification display button 77B for displaying notifications, a distribution button 77C for performing distribution, a lottery button 77D for performing a lottery, and an edit button 77E for editing profile information and the like are displayed. In this embodiment, the application screen 75 shown in FIG. 14 is set as the home screen.

The tabs 76 are a tab 76A corresponding to a follow screen, a tab 76B corresponding to a recommendation screen, a tab 76C corresponding to an attention screen, a tab 76D corresponding to a collaboration waiting screen, and a tab 76E corresponding to a game screen, and are GUIs by which these categories can be selected. FIG. 14 shows a selection screen 78 when tab 76B is selected. Thumbnail images 78A of viewable videos are displayed on the selection screen 78.

At a predetermined position on the selection screen 78, a banner 71C associated with the selection screen 78 and based on the user's history data is displayed. The banner display conditions associated with the selection screen 78 are conditions relating to the viewing history. This banner display conditions are (i) that there is no viewing history (fifth banner display condition), (ii) that there is a viewing history and a predetermined function has never been used (sixth banner display condition), and (iii) that there is a viewing history and a predetermined function has been used (seventh banner display condition). The viewing history data 51 satisfies any one of the fifth banner display condition to the seventh banner display condition.

The fifth banner display condition is associated with the banner 71C relating to the video viewing method. The banner 71C is associated with a link for transitioning to a guidance screen displaying information relating to the viewing method. On the guidance screen, notifications of a recommended action for viewing and how to find a favorite video are displayed.

The sixth banner display condition is associated with, for example, a banner 71 (not shown) relating to how to use a predetermined function. The banner 71 (not shown) is associated with a link for transitioning to a guidance screen that displays the usage method of a predetermined function such as a photographing function.

The seventh banner display condition is associated with, for example, a banner 71 (not shown) relating to a popular distributing user. The banner 71 is associated with a link for transitioning to a screen on which a ranking of distributing users is displayed. In the example of the application screen 75 of FIG. 14, the banner 71 is displayed on the upper part of the screen. The display position on the screen may be changed according to the banner 71.

When the user performs an operation of selecting the banner 71, the user device 12 displays on the display 28 a guidance screen for the transition destination based on a link associated with the banner 71. The guidance screen 78B shown in FIG. 14 is a guidance screen 78B displayed when the banner 71C corresponding to the fifth banner display condition is selected.

Figure 15:
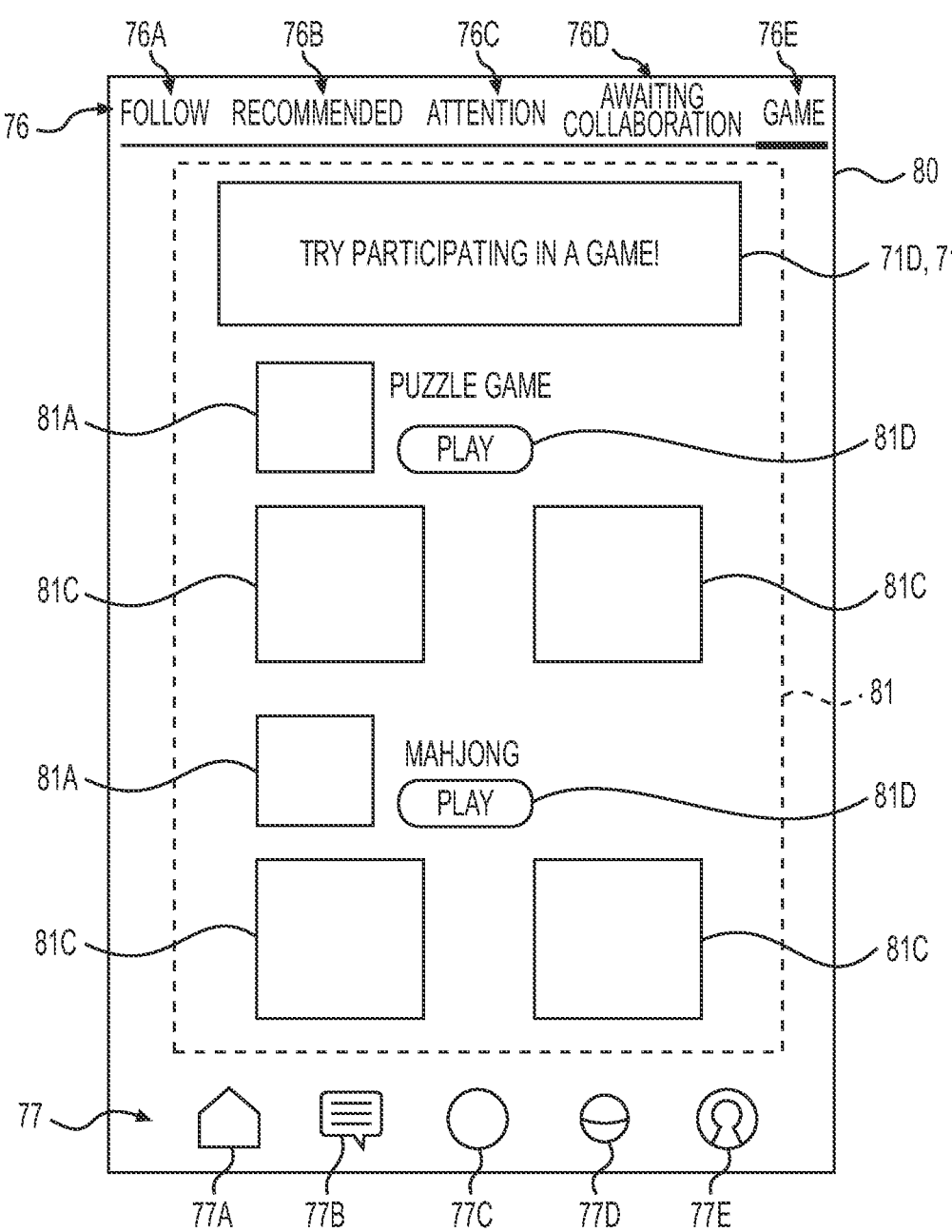
FIG. 15 is a diagram showing an application screen in the same embodiment.

FIG. 15 shows the application screen 80 when the tab 76E of "Games" is selected. On the application screen 80, a selection screen 81 for playing a game is displayed. On the selection screen 81, images 81A of games selectable by the user, images 81C corresponding to videos that distribute videos for playing the games, and an execution button 81D for starting the game are displayed. Further, a banner 71D is displayed at a predetermined position on the selection screen 81.

The selection screen 81 is associated with display conditions related to the game history. The display conditions related to the game history are (i) that the user has never participated in the games (eighth banner display condition), (ii) that the user has participated in some of the games (ninth banner display condition), and (iii) that the user has participated in all the games (tenth banner display condition).

The banner 71D for beginners is associated with the eighth banner display condition. The banner 71D is associated with a link on the screen showing how to participate in the games. The ninth banner display condition is associated with a banner 71 (not shown) relating to a game the user has never played. The controller 30 refers to the user's game history data 53 and selects a banner 71 (not shown) of a game in which the user has never participated. The tenth banner display condition is associated with the banner 71D relating to game score ranking information. A link to a screen displaying ranking information is associated with the banner 71D. In the example of the application screen 80 of FIG. 15, the banner 71 is displayed on the upper part of the screen. The display position on the screen may be changed according to the type of the banner 71.

Figure 16:
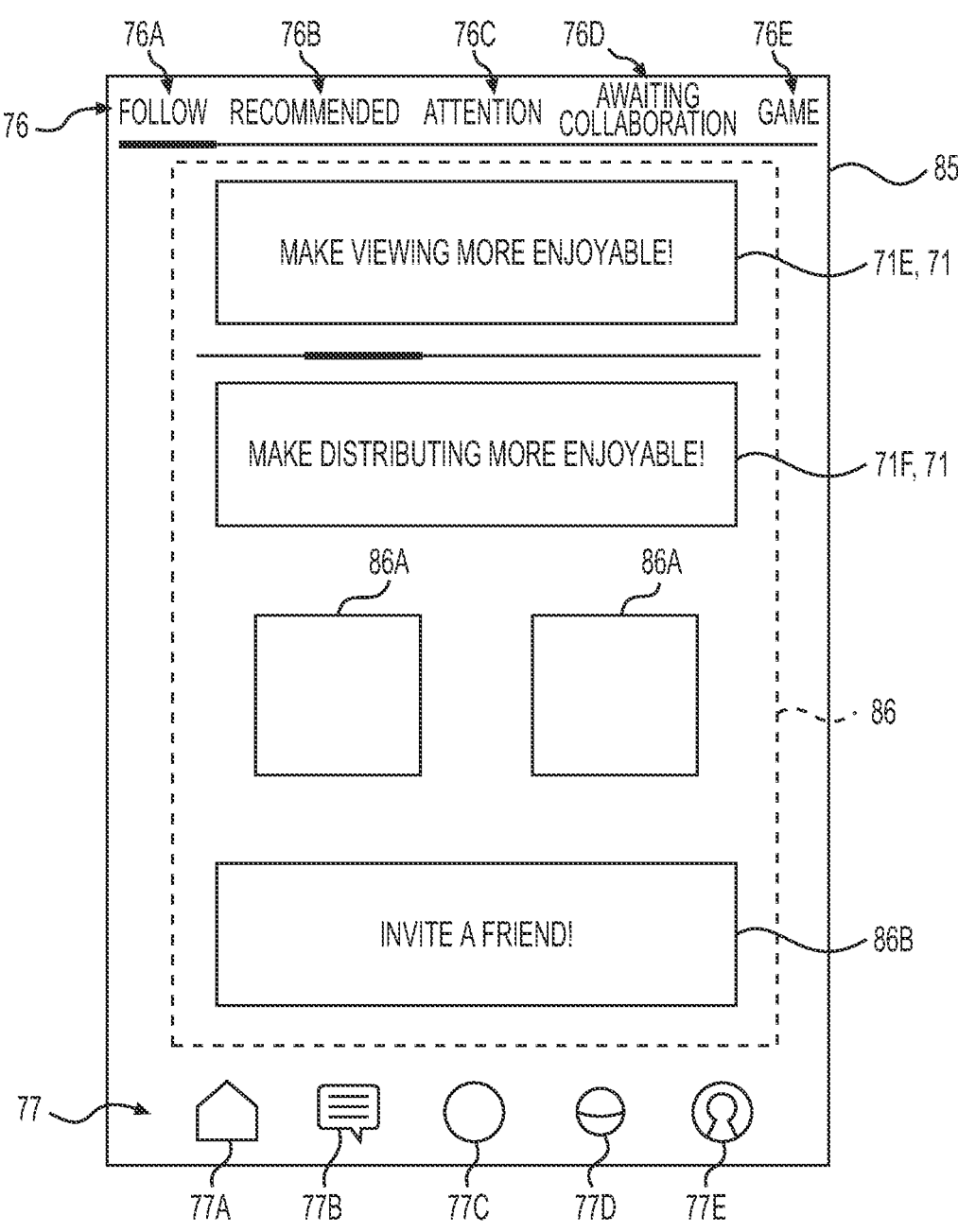
FIG. 16 is a diagram showing an application screen in the same embodiment.

FIG. 16 shows an example of the application screen 85 when the "follow" tab 76A is selected. A selection screen 86 is displayed on the application screen 85. On the selection screen 86, images 86A of recommended information (suggested information) to be proposed to the user is displayed. At a predetermined position on the selection screen 86, banners 71 associated with the selection screen 86 and based on the user's history data are displayed. In FIG. 16, a banner 71E relating to viewing a video and a banner 71F relating to distribution of a video are displayed.

The banner display conditions associated with the selection screen 86 are display conditions related to the user's viewing history and distribution history. The banner display conditions related to the viewing history are "the number of views exceeds N", "the cumulative viewing time exceeds M hours", "the number of views is N or less", and "the cumulative viewing time is M hours or less", or the like. "N" and "M" are arbitrary natural numbers (predetermined number of times). The display conditions related to the distribution history are "the number of distributions exceeds P", "the cumulative distribution time exceeds Q hours", "the number of distributions is P or less", and "the cumulative distribution time is Q hours or less", or the like. "P" and "Q" are arbitrary natural numbers (predetermined number of times).

The banner display conditions indicating that the user has a small number of viewings and that the cumulative viewing time is short are associated with the banner 71E relating to the viewing method. The banner 71E is associated with a link that transitions to a guidance screen for viewing.

Further, the banner display conditions indicating that the user has a large number of viewings and that the cumulative viewing time is long are associated with, for example, a banner 71 (not shown) relating to rankings or the like. The banner 71 (not shown) is associated with a link that transitions to a screen that displays a ranking or the like of videos having a large number of viewers.

Further, the banner display conditions indicating that the user has a small number of distributions and that the cumulative distribution time is short are associated with a banner 71F relating to the distribution method. The banner 71F is associated with a link that transitions to a guidance screen displaying a distribution method. On the guidance screen, for example, notifications of recommended actions at the time of distribution and tips for communication with fans are displayed.

Further, the banner display conditions indicating that the user has a large number of distributions and that the cumulative distribution time is long are associated with a banner 71 (not shown) related to rankings or the like. The banner 71 (not shown) is associated with a screen that displays a ranking of users who have a large number of distributions and a link that transitions to a screen that describes a distribution method that has a high degree of difficulty among the distribution methods. In the example of the application screen 85 of FIG. 16, the banners 71 are displayed on the upper part of the screen. The display position on the screen may be changed according to the type of the banner 71. Further, when displaying a plurality of banners 71, the order may be changed according to the user's history. For example, the order of the banners 71 may be changed based on the magnitude of (i) the deviation between the number of views and a predetermined number of times related to number of views, and (ii) the deviation between the number of distributions and a predetermined number of times related to the number of distributions. For example, when the deviation between the number of views and the predetermined number of times is larger than the difference between the number of distributions and the predetermined number of times, the banner 71E regarding viewing may be displayed above the banner 71F regarding distribution.

Figure 17:
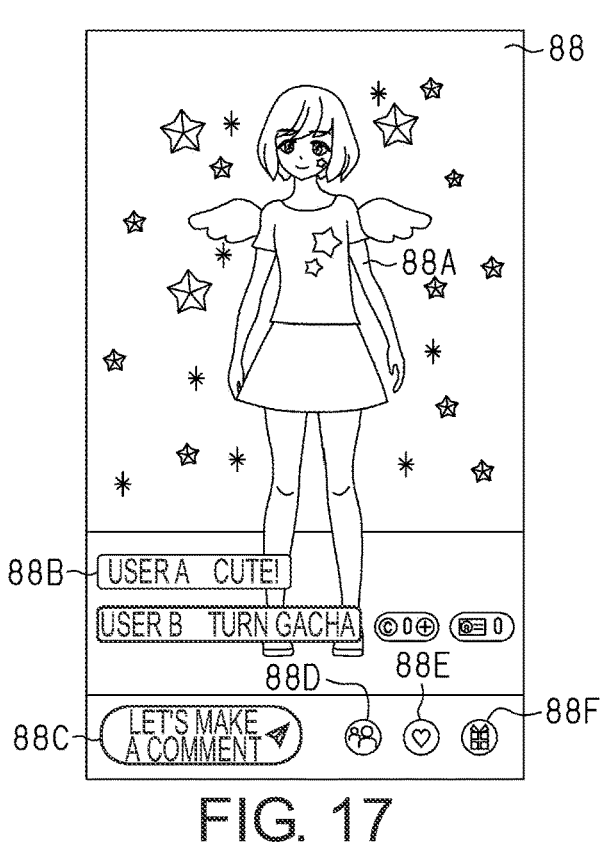
FIG. 17 is a diagram showing a viewing screen in the same embodiment.

FIG. 17 is an example of a viewing screen 88 displayed on the viewing user device 12B. The viewing screen 88 is the application screen 75 shown in FIG. 14, and is displayed by the viewing user selecting the thumbnail image 78A of a video. An avatar object 88A corresponding to the distributing user is displayed. The viewing screen 88 includes a message display portion 88B, a message input portion 88C, and an evaluation button 88E. Further, the viewing screen 88 may include a collaboration request button 88D for requesting that the distributing user participate in collaborative distribution, and a gift display button 88F for displaying a gift object in the video. On this screen, the viewing user can input impressions of automatic trials into the message input portion 88C and send the message to the distributing user device 12A of the distributing user via the server 13. In addition, the viewing user can display an index showing a favorable evaluation on the video by selecting the evaluation button 88E.

Effects of the first embodiment will be described.

(1-1) The server 13 selects a banner 71 associated with the selection screen selected by the user based on history data 60 that records the action history related to distribution or viewing of the video, and displays the banner on the user device 12. Therefore, the banner 71 that matches the user's interest and action history is displayed on the user device 12. Accordingly, it is possible to provide information potentially required by the user as compared with the case where banner images are displayed in a standard fashion.

(1-2) The server 13 selects a banner 71 associated with a link to a guidance screen of a production function, for users who do not have an execution history of the production function, such as a photographing function, an emote function, and a game distribution function. Therefore, it is possible to raise the user's awareness of the production function and, by extension, increase the frequency of use of the production function.

(1-3) The server 13 selects a banner 71 associated with a link to a guidance screen of the photographing function for saving the image data of one scene of a video, for users who do not have an execution history of the photographing function. Therefore, it is possible to raise the user's awareness of the photographing function and, by extension, activate communication between users in the video.

(1-4) The server 13 selects a banner 71 corresponding to a lottery that the user has never executed. Through this, displaying of the banner 71 regarding a lottery that has been executed by the user is suppressed. As a result, the user's awareness of new lotteries is increased, so that the opportunity for the user to perform lotteries can be increased.

(1-5) The server 13 selects a banner 71 corresponding to a lottery that does not include objects associated with the user. When this lottery is executed, the objects owned by the user do not overlap, so that the user can be motivated to execute the lottery. In addition, the user's satisfaction with the lottery can be increased.

(1-6) The server 13 identifies a game that the user has never played, and displays a banner 71 related to the identified game process. Therefore, since the user's awareness of the game that the user has not played is increased, opportunities for the user to play the game can be increased.

(1-7) A banner 71 capable of displaying a guidance screen regarding distribution methods is displayed on the user device 12 of a user who has a small number of distributions or a user who has a short cumulative distribution time. Therefore, it is possible to increase opportunities for the user to distribute videos.

(1-8) A banner 71 capable of displaying a guidance screen regarding viewing methods is displayed on the user device 12 of a user who has a small number of viewings or a user who has a short cumulative viewing time. Therefore, it is possible to increase opportunities for the user to watch videos.

Second Embodiment

Next, a second embodiment of the information processing system will be described. In the first embodiment, the information processing system is a system for distributing videos. The second embodiment differs from the first embodiment in that the information processing system is a system in which an avatar object corresponding to a user moves in a virtual space according to the intentions of the user. That is, in the first embodiment, the banner 71 is a two-dimensional image displayed on the selection screen, but in the second embodiment, the banner itself is an object having three-dimensional coordinates, or a two-dimensional banner is provided on a three-dimensional object.

However, in the second embodiment as well, the banner may be selected based on (i) a category or area corresponding to a selection screen selected by the user, and (ii) the history data 60 indicating the user's action history in the virtual space. That is, as in the first embodiment, when the user's history data 60 satisfies a banner display condition, the server 13 may select a banner satisfying the banner display condition and display the banner in the virtual space. Further, a banner having the same contents as in the first embodiment may be displayed. Specifically, a banner related to a lottery or a banner related to a game may be displayed. Further, when it is possible to distribute a video in the virtual space, a banner related to distribution or a banner related to viewing may be displayed.

<Display Position of Banner Object>

Figure 18:
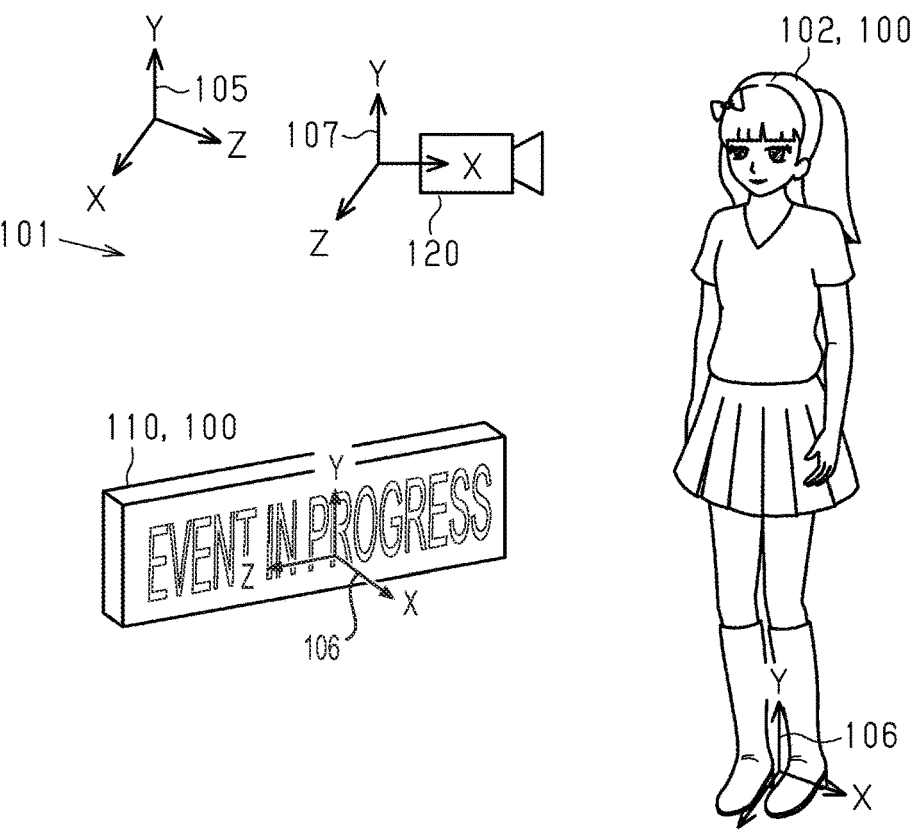
FIG. 18 is a diagram illustrating a virtual space coordinate system, avatar object and banner object in a second embodiment.

As shown in FIG. 18, a global coordinate system 105 is set in a virtual space 101. The global coordinate system 105 is a coordinate system for defining a position in the entire virtual space 101. For example, the position of objects 100 including an avatar object 102 can be specified on the global coordinate system 105. A local coordinate system 106 is set for each object 100 in the virtual space 101. The local coordinate system 106 has as its origin a reference point set on the object. The orientation of the object 100 can be controlled using the local coordinate system 106.

The avatar object 102 can change orientation in the rotational direction centered on the Y-axis direction of the local coordinate system 106 based on the user's movements, or the user's operation of the user's operation portion 27. In addition, it is possible to move movable parts such as arms, legs, and head based on the user's movements or operations. Further, the posture can be displaced in the Y-axis direction, such as from an upright state to a bent state. Further, it is possible to move or operate in the X-axis direction and the Z-axis direction of the global coordinate system 105 in the virtual space based on the user's movements or operation of the user's operation portion 27 or the like. Further, when an augmented reality image is displayed on the display 28 of the user device 12, the augmented reality image is displayed on an actual image taken by a camera provided in the user device 12, but in this case, the orientation of the avatar object 102 can be changed based on walking or the like by the viewing user who operates the position of the camera of the user device 12. The movement of the avatar object 102 is not limited to the above.

The user visualizes the virtual space 101 from the eye position of the avatar object 102 corresponding to the user himself. That is, the controller 20 of the user device 12 sets a visual field reference position (viewpoint) set at the center of the eyes or the head of the avatar object 102, and displays on the display 28 the image of the virtual space seen from the visual field reference position.

Alternatively, a camera 120 that photographs the avatar object 102 may be set in the virtual space. The camera 120 is set with a camera coordinate system 107 whose origin is the position of the camera 120. When creating an image observed from the camera 120, first the coordinates of the object arranged in the virtual space are converted into the coordinates of the camera coordinate system 107. The camera coordinate system 107 includes an X-axis parallel to the optical axis of the camera 120, a Y-axis parallel to or substantially parallel to the vertical direction, and a Z-axis.

The objects 100 displayed in the virtual space 101 include the banner 110. The banner 110 may be an object, such as a signboard, whose purpose is only to display information to be presented to the user. Alternatively, the banner 110 may be an object having a purpose other than the banner display in the virtual space 101, such as a wall of a room. When a banner is displayed on an object such as a wall, a predetermined surface of this object is the banner display surface. The position information of the banner 110 includes the three-dimensional coordinates (X, Y, Z) of the global coordinate system 105 and rotation angles (X$\theta$, Y$\theta$, Z$\theta$) about the X-axis, Y-axis, and Z-axis of the local coordinate system 106.

Figure 19:
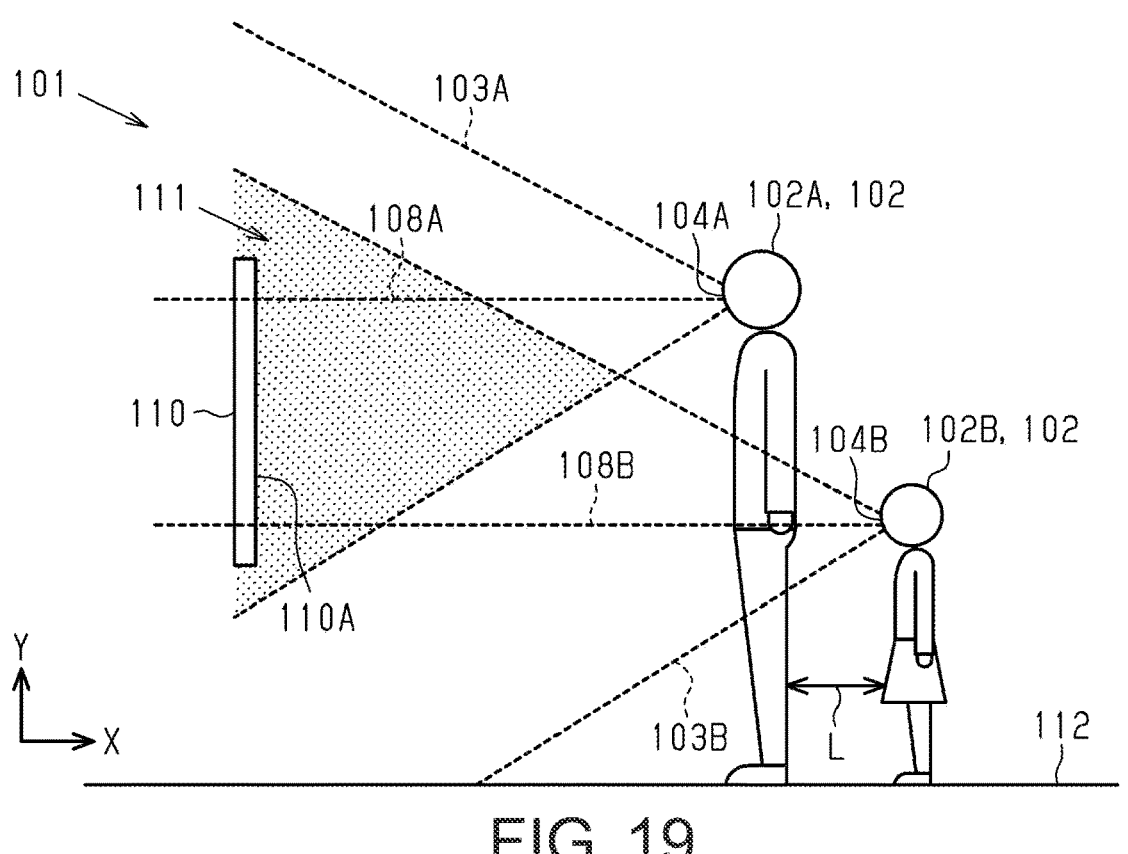
FIG. 19 is a diagram illustrating the relationship between the field of view of the avatar object and the banner object in the same embodiment.

FIG. 19 is an example of the display position of the banner 110. The banner 110 is displayed at a position easily visible to a plurality of avatar objects 102 in a nearby state. When the banner display condition for displaying the banner is satisfied in both an avatar object 102A corresponding to a first user and an avatar object 102B corresponding to a second user, the banner 110 is displayed so as to be included in the viewing ranges 103A and 103B of both the avatar object 102A and the avatar object 102B. The banner display conditions are that the relative distance L of the avatar object 102A and the avatar object 102B is a predetermined distance or less, or the avatar object 102A and the avatar object 102B are friends or the like and are associated with each other, or the like.

The viewing ranges 103A and 103B are ranges that extend three-dimensionally in front of the avatar objects 102A and 102B centering on field-of-view reference positions 104A and 104B of the avatar objects 102A and 102B. The viewing ranges 103A and 103B may be conical optical cones having the field-of-view reference positions 104A and 104B as vertices, respectively, or may be quadrangular pyramids. The viewing ranges 103A and 103B are centered on visual centers 108A and 108B extending from the field-of-view reference positions 104A and 104B, respectively.

The banner 110 is arranged in an overlap area 111 where the viewing ranges 103A and 103B overlap. At this time, the rotation angles (X$\theta$, Y$\theta$, Z$\theta$) of the banner 110 may be adjusted so that the front surface 110A thereof is perpendicular to at least one of the visual centers 108A and 108B of the avatar objects 102A and 102B. When the visual centers 108A and 108B of the avatar objects 102A and 102B are in different directions, the banner 110 may be adjusted so as to be alternately perpendicular to the visual centers 108A and 108B. Alternatively, the banner 110 may be adjusted so as to be perpendicular to either one of the visual centers 108A and 108B.

The position of the banner 110 in the depth direction (the position in the X-axis direction in FIG. 19) may be a position separated by a predetermined distance from one of the avatar objects 102 among the avatar objects 102A and 102B. Alternatively, the position of the banner 110 may be a position separated by a predetermined distance from the midpoint between the avatar objects 102A and 102B in the depth direction (negative direction of the X-axis in FIG. 19). Further, when the directions of the visual centers 108A and 108B of the avatar objects 102A and 102B are opposite to each other, for example, in a state where the avatar objects 102A and 102B face each other, the banner 110 may be arranged at the midpoint between the avatar objects 102A and 102B. At this time, the banner image may be displayed on a first surface of the banner 110 facing one avatar object 102A and a second surface facing the other avatar object 102B. Further, banners 110 having the same content or banners 110 having different content may be displayed in each of the viewing sight directions of the avatar objects 102A and 102B.

Further, the banner 110 may be moved so as to always keep a constant distance from any one of the avatar objects 102A and 102B or the intermediate position between the avatar objects 102A and 102B. That is, when the avatar objects 102A and 102B move in the anti-X-axis direction (negative direction of the X-axis) in FIG. 19, the banner 110 also moves in the same direction as the avatar objects 102A and 102B. At this time, if the banner 110 overlaps with and interferes with another object (for example, another avatar object 102) in the virtual space 101, the banner 110 is temporarily deleted, and is redisplayed when the banner 110 and the object no longer interfere with each other.

The banner 110 is displayed only while the avatar objects 102A and 102B are located in a predetermined area of the virtual space 101, and may be deleted when the avatar objects 102A and 102B leave the predetermined area. The predetermined area is, for example, a store, a live venue, a stadium, or the like in the virtual space 101. Further, the banner 110 may begin to be displayed when a display start condition is satisfied, and may be deleted after being displayed for a predetermined period.

As shown in FIG. 19, the banner 110 may float from the ground 112 of the virtual space 101 or the floor of a building. The banner 110 may be an outer wall of a building, a signboard provided in a virtual space, an indoor wall, indoor furniture, indoor equipment, or the like.

<Display Content of Banner Object>

(Movement of Position)

The banner 110 may be associated with different coordinates in the same virtual space as the virtual space in which the avatar object 102 is located. For example, when the user selects and operates the banner 110 by the operation portion 27 or the like, or views the banner 110 continuously for a predetermined time, the banner 110 is placed in a selected state.

Figure 20:
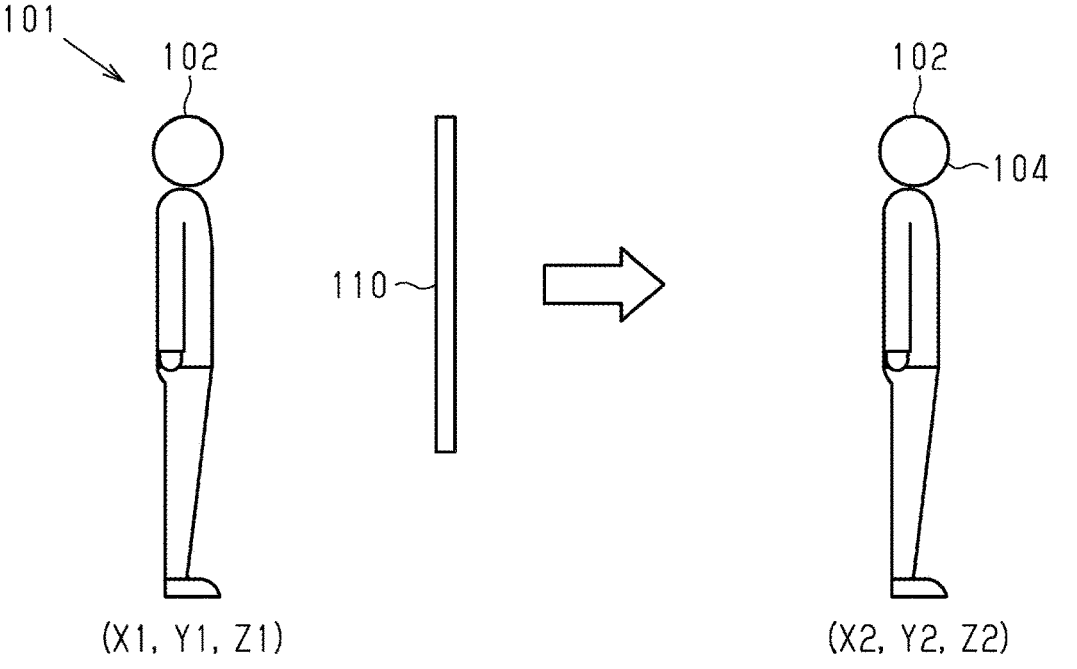
FIG. 20 is a diagram schematically showing the avatar object and the banner object in the same embodiment.

As shown in FIG. 20, when the banner 110 is in the selected state, the controller 20 of the user device 12 causes a first position (X1, Y1, Z1) where the avatar object 102 exists to move to a position (X2, Y2, Z2) associated with the banner 110. Then, the image of the virtual space 101 is rendered with reference to the field-of-view reference position 104 of the avatar object 102 located at the second position (X2, Y2, Z2), and the generated image is output to the display 28.

Conventionally, in order to move the avatar object 102 to a target position in the virtual space 101, the avatar object 102 passed through the virtual space 101 to reach the target position, or returned to an initial position (home position) such as a lobby and a link for transitioning to the target position was selected. However, by selecting a banner 110 by which the user can move position, the user can immediately move in the virtual space 101 without returning to the initial position.

(Function Display)

The banner 110 may be an object that expresses a production function. The banner display condition is, for example, (i) that the relative distance L between a plurality of avatar objects 102 is not more than a predetermined distance, (ii) that an avatar object 102 performs a predetermined operation, or the like. When this banner display condition is satisfied, the controller 20 of the user device 12 displays the banner 110. The banner 110 is (i) an object that expresses a photographing function for taking a group photo by being selected, (ii) an object that expresses a movement function that moves to a stage or a game field where a plurality of avatar objects 102 gather, (iii) an object that expresses an emote function, (iv) an object that expresses a game distribution function, or the like. When any one of the plurality of users performs a selection operation on the banner 110, the banner 110 is placed in the selected state.

Figures 21, 22:
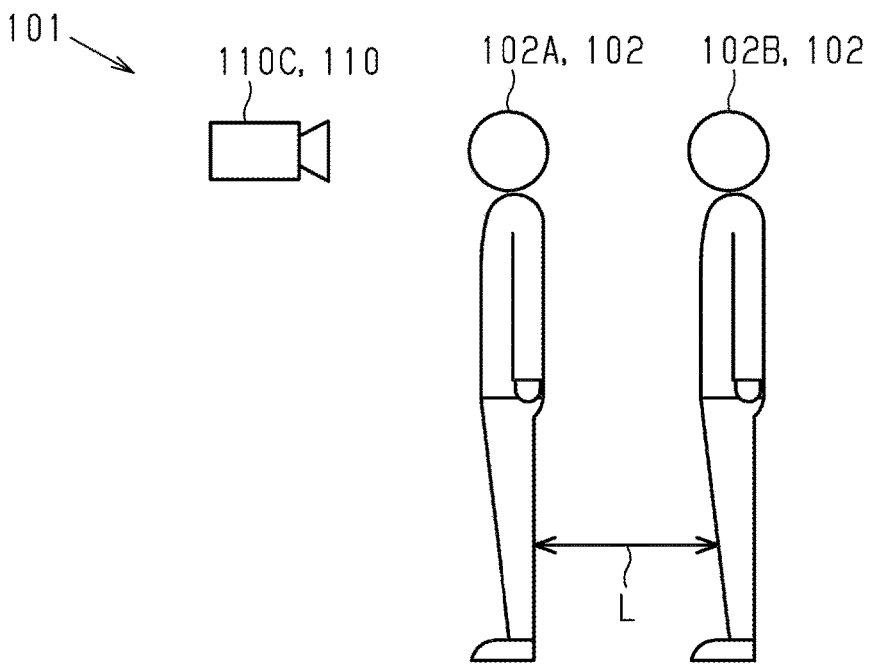
FIG. 21 is a diagram schematically showing the avatar object and the banner object in the same embodiment.
FIG. 22 is a diagram showing display request data of the same embodiment.

As shown in FIG. 21, for example, a banner 110C that expresses a photographing function is displayed in the virtual space. When the banner 110C is in the selected state, with the banner 110C as the viewpoint of the camera, an image including the avatar objects 102A and 102B viewed from the viewpoint is captured. The image data generated by photographing is stored in the storage 22 of the user device

12 used by a user who satisfies the banner display condition. At this time, only the avatar object 102 that satisfies the banner display condition and objects such as the background may be photographed, and an avatar object 102 that does not satisfy the banner display condition may be hidden. The banner 110C is also referred to as a banner object or a function expression object.

Further, when a banner 110 (not shown) that moves to a predetermined place is selected, all the users who satisfy the banner display condition move to the position associated with the banner 110 at once.

Further, when a banner 110 (not shown) that expresses an emote function is selected, all users who satisfy the banner display condition apply to the avatar objects 102 movements and dances that can only be performed by a plurality of people.

Furthermore, when a game (not shown) that can only be played by a plurality of players is selected, the game can be started by all users or some users who satisfy the banner display condition(s).

(Request for Display Content)

The banner 110 may display content requested by the user. The user can register the display position and the display content in the server 13. The request for displaying the banner may require payment of coins, points, or the like.

FIG. 22 is display request data 90 showing the contents of the banner requested by the user. The display request data 90 includes the requester, the content, the position, and the display period associated with the banner ID. The requester is the user who requested the display of the banner. The content indicates the content of the banner. The position indicates the display position of the banner in the virtual space. The display period indicates the display period of the banner.

The controller 20 of the user device 12 requests information on banners within a predetermined distance range from the position (X, Y, Z) of the avatar object 102, accompanying movement of the avatar object 102. In response to the request received from the user device 12, the server 13 sends the image of the banner corresponding to the display request data 90 whose display period includes the time when the request is received to the user device 12 together with the position and the display period. The user device 12 receives the image, the position, and the display period of the banner. Then, when the position of the banner is included in the field of view of the avatar object 102, the image of the banner is displayed as a part of the image in the virtual space.

Further, the banner 110 may output a sound by satisfying the banner display condition. The banner display condition is that the relative distance between the banner 110 and the avatar object 102 is not greater than a predetermined distance, or that the banner 110 is selected by the avatar object 102.

Further, the banner 110 is displayed in the space (room) associated with the avatar object 102, and may be content related to this avatar object 102. For example, an introduction to and profile of music provided by the user corresponding to the avatar object 102 may be displayed.

Next, effects of the second embodiment will be described.

(2-1) The banner 110 is displayed in the viewing ranges 103A and 103B of the plurality of avatar objects 102A and 102B. Therefore, it is possible to increase opportunities for users who view the virtual space 101 at the field-of-view reference position 104 of the avatar object 102 to view the banner 110.

(2-2) The banner 110 is associated with predetermined coordinates in the virtual space 101, such as an event venue or the like. By selecting the banner 110, the user can move to the position indicated by the predetermined coordinates in a short time.

(2-3) If the banner display condition is satisfied when a plurality of avatar objects 102 is gathered, a banner 110 capable of expressing a function that can be used by the avatar objects 102, such as a photographing function, is displayed. Therefore, the banner 110 can be displayed at an appropriate time even without the user knowing how to cause the production function to be expressed, so that the production function can be easily used.

(2-4) The user can request the display of the banner 110 in the virtual space 101. Therefore, it is possible to display a message to another user who has a friendly relationship with the user, to promote commercial transactions in the virtual space, or the like.

The above embodiments can be changed and implemented as follows. The above embodiments and the following modified examples can be implemented in combination with each other within a technically consistent range.

(Banner Display Content)

The banner 110 may reflect the avatar object corresponding to the user himself. When the banner display condition is satisfied, the controller 20 of the user device 12 causes the avatar object 102 to be displayed on the banner 110. The banner display condition is (i) that the relative distance between the banner 110 and the avatar object 102 is not greater than a predetermined distance, or (ii) that the banner 110 is selected by the avatar object 102. For example, in the case of a banner promoting an attached item of the avatar object 102, the controller 20 applies the attached object to a user avatar object 102 that satisfies the banner display condition. The user can view the banner and can easily confirm the state in which the avatar object 102 has attached the attached object.

The banner object may be one that causes a predetermined object to appear by satisfying a banner display condition. The banner display condition is (i) that the relative distance between the banner 110 and the avatar object 102 is not greater than a predetermined distance, or (ii) that the banner 110 is selected by the avatar object 102. The predetermined object that appears from the banner object is an attached object or the like that can be an applied to the avatar object 102.

When a first user displays on the display 28 a display portion on which the profile of a second user is displayed, a banner displaying the parts associated with the avatar object 102 of the second user may be displayed. An avatar object 102 corresponding to the first user is displayed on this banner, and attached parts or non-attached parts associated with the second user may be applied to this avatar object 102. This banner may be the banner 71 displayed on the screen of the application as in the first embodiment, or may be the banner 110 displayed in the virtual space as in the second embodiment.

The server 13 may learn the tendencies of the attached parts and the non-attached parts associated with the user. For example, the server 13 accumulates the usage history of the attached parts and specifies the attributes of the attached parts that are frequently used or purchased. The attributes are color, type, and the like. Then, the attributes of the specified attached parts may be reflected in the banner. For example, a banner displaying red attached parts is displayed to the user who is presumed to prefer "red" attached parts. This banner may be the banner 71 displayed on the screen of the application as in the first embodiment, or may be the banner 110 displayed in the virtual space as in the second embodiment.

The server 13 may display a banner 71 relating to a distributing user having a high viewing frequency based on the viewing history data 51 of the user.

The server 13 may display the banner 71 on a video that is being distributed. In this case, the server 13 may display the banner 71 based on analysis of messages posted to the video or analysis of content spoken by the distributing user. For example, if the analysis portion of the server 13 determines that the frequency of the word "fireworks display" is high, a banner 71 related to the fireworks display may be displayed.

(Information Processing System)

The sensor portion 24 is made to acquire detection data that detects changes in the user's facial expression, head movement, and the user's relative position with respect to the sensor portion 24, but even at least one of these is fine. In addition, the sensor portion 24 may acquire other detection data such as detection data that detects movement other than head movement, in addition to or instead of at least one out of the changes in the user's facial expression, the head movement, and the user's relative position.

The virtual space displayed in the video may be an augmented reality (AR) space. For example, animation such as an avatar object and a gift object based on data sent from the distributing user device 12A may be superimposed and displayed on a real-world image taken by the camera of the viewing user device 12B. Alternatively, the distributing user device 12A may generate a video by superimposing animation such as an avatar object and a gift object on a real-world image taken by its own camera, encode the video, and send the video to the server 13.

In each of the above embodiments, the user device 12 is an information processing device such as a smartphone, a mobile phone, a tablet terminal, a personal computer, a game console, or a wearable computer such as a head-mounted display. Instead of this, the information processing system may be a system provided in a studio for video distribution. The information processing system includes an information processing device, a server, the sensor portion 24 mounted on the body of a distributing user, a tracking system for detecting the position of the sensor portion 24, the operation portion 27, the speaker 25, and the display 28. The tracking system may include a multi-axis laser emitter that emits pulsed laser light for synchronization. The sensor portion 24 includes a sensor that detects the laser beam, and detects its own position and orientation while synchronizing with the synchronization pulse. As the sensor portion 24, for example, Vive Tracker (registered trademark) and Vive Base Station (registered trademark) provided by HTC Corporation (registered trademark) can be used.

By executing the management program 350, the controller 30 of the server 13 functions as a management portion, a history recording portion, a specifying portion, a history acquisition portion, a banner selection portion, an output controller, a specified process execution portion, a lottery execution portion, and a game execution portion. At least one of these may be executed by the user device 12 or another device constituting the information processing system 11.

By executing the application program 220, the controller 20 of the user device 12 is configured to function as a history data transmission portion, a specifying portion, a history acquisition portion, a banner acquisition portion, and an output controller. At least one of these may be executed by the server 13 or another device constituting the information processing system 11.

Next, technical ideas that can be grasped from the above embodiments and other example will be added below.

[A] An information processing system comprising:
   a drawing portion that draws (i) an image of a virtual space including an avatar object associated with a user and (ii) another object;
   a movement controller that causes the avatar object to move within the virtual space based on operation by the user;
   a condition determination portion that determines whether or not a banner display condition is satisfied; and
   an output controller that specifies the position of the avatar object and displays a banner object in the viewing range of the avatar object.

[B] An information processing system comprising:
   a drawing portion that draws an image of a virtual space including a first avatar object associated with a first user, a second avatar object associated with a second user, and another object;
   a condition determination portion that determines whether or not a banner display condition is satisfied;
   a first viewing range specifying portion that specifies a position of the first avatar object and specifies a first viewing range of the first avatar object;
   a second viewing range specifying portion that specifies a position of the second avatar object and specifies a second viewing range of the second avatar object;
   a specifying portion that specifies an overlap region of the first viewing range and the second viewing range; and
   an output controller that displays a banner object in the overlap region.

[C] An information processing system comprising:
   a drawing portion that draws an image of a virtual space including (i) an avatar object associated with a user and (ii) a banner object;
   a selection portion that selects the banner object based on operation by the user; and
   a movement controller that causes the avatar object to move the position of the avatar object in the virtual space to another position in the virtual space associated with the banner object, when the banner object is selected.

[D] An information processing system comprising:
   a drawing portion that draws an image of a virtual space including avatar objects associated with each of a plurality of users;
   a determination portion that determines whether or not at least one of the plurality of avatar objects satisfies a banner display condition; and
   an output controller that displays in the virtual space a banner object expressing functions usable by the plurality of avatar objects, when at least one of the plurality of avatar objects satisfies the banner display condition.

[E] An information processing system comprising:
   a drawing portion that draws an image of a virtual space including (i) an avatar object associated with a user and (ii) a banner object;
   a registration portion that receives a display request for the banner object from a user device used by the user and registers the display request as display request information; and
   an output controller that displays the banner object based on the display request information.

DESCRIPTION OF REFERENCE SYMBOLS

11 Information processing system
12 User device
13 Server

The invention claimed is:

1. An information processing device comprising:
   circuitry configured to:
   manage distribution of a video including animation of an avatar object corresponding to a user;
   acquire history data including user action history relating to the distribution or viewing of the video from a user device used by the user, and record the history data in a memory;
   acquire the history data of the user associated with a selection screen selected by the user, from among the history data;
   specify each banner display condition corresponding respectively to each of a plurality of banners associated with the selection screen;
   determine a banner display condition that matches the acquired history data, from among the specified banner display conditions; and
   select a banner corresponding to the banner display condition that matches the acquired history data, from among the plurality of banners, and send rendering data for the banner to the user device, wherein the banner is selected based on the acquired history data associated with the selection screen selected by the user.

2. The information processing device according to claim 1, wherein
   the history data includes an execution history of a production process executed during the distribution or the viewing of the video based on an input operation by the user, and
   the circuitry selects the banner that transitions to a guidance screen related to the production process with no execution history, based on the history data.

3. The information processing device according to claim 2, wherein
   the production process is a photographing process that stores image data of a captured scene of the video, based on the input operation by the user,
   the history data includes the execution history of the photographing process based on the input operation by the user, and
   the circuitry selects the banner that transitions to the guidance screen of the photographing process, when it is determined that the user has no execution history for the photographing process, based on the execution history of the photographing process in the history data.

4. The information processing device according to claim 1, further comprising
   a lottery target memory that stores a plurality of lottery target groups each including a plurality of lottery targets, wherein the circuitry selects a lottery target group from among the plurality of lottery target groups based on an input operation from the user, and executes a lottery that selects a predetermined number of lottery targets from among the lottery target group selected, the history data includes identification information for the selected lottery target group, and the circuitry selects the banner corresponding to a lottery target group different from the selected lottery target group, based on the identification information of the lottery target group in the history data.

5. The information processing device according to claim 1, further comprising a lottery target memory that stores a plurality of lottery target groups each including a plurality of lottery targets, wherein the circuitry executes a lottery that selects a predetermined number of lottery targets from among the lottery target groups based on an input operation from the user, and a target memory that stores the selected lottery target or targets in association with the user, wherein the history data includes identification information for the selected lottery target or targets associated with the user, and the circuitry specifies the lottery target groups that do not include the selected lottery target or targets associated with the user, based on the identification information in the history data, and selects the banner corresponding to the specified lottery target groups.

6. The information processing device according to claim 1, wherein the history data includes a distribution history of a game executed by the user, from among games for which an execution status has been distributed in the video, and the circuitry specifies the game or games having no distribution history based on the distribution history of the games in the history data, and selects the banner associated with the specified games.

7. The information processing device according to claim 1, wherein the history data includes a distribution frequency of the video of the user, or a cumulative distribution time of the video, and the circuitry selects the banner that transitions to a guidance screen related to a distribution method of the video, for the user for which the distribution frequency included in the history data is not greater than a predetermined number, or for which the cumulative distribution time included in the history data is not greater than a predetermined time.

8. The information processing device according to claim 1, wherein the history data includes a viewing frequency of the video of the user, or a cumulative viewing time of the video, and the circuitry selects the banner that transitions to a guidance screen related to a viewing method of the video, for the user for which the viewing frequency included in the history data is not greater than a predetermined number, or for which the cumulative viewing time included in the history data is not greater than a predetermined time.

9. The information processing device according to claim 1, wherein a plurality of the selection screens are selectable by the user, and different banners are associated with each selection screen.

10. An information processing method by one or a plurality of computers, the method comprising:

managing distribution of a video including animation of an avatar object corresponding to a user;

acquiring history data including user action history relating to the distribution or viewing of the video from a user device used by the user, and recording the history data in a memory;

acquiring the history data of the user associated with a selection screen selected by the user, from among the history data;

specifying each banner display condition corresponding respectively to each of a plurality of banners associated with the selection screen;

determining a banner display condition that matches the acquired history data, from among the specified banner display conditions; and selecting a banner corresponding to the banner display condition that matches the acquired history data, from among the plurality of banners, and sending rendering data for the banner to the user device, wherein the banner is selected based on the acquired history data associated with the selection screen selected by the user.

11. The information processing method according to claim 10, wherein a plurality of the selection screens are selectable by the user, and different banners are associated with each selection screen.

12. A non-transitory computer-readable medium storing thereon a program for causing one or a plurality of computers to execute:

sending, to a server, history data including user action history of a user related to distribution or viewing of a video;

receiving, from the server, rendering data for banners associated with a plurality of selection screens selectable by the user, the banners each having a banner display condition matching the history data of the user, and recording the rendering data in a memory; and displaying the banners on the selection screens using the rendering data received, wherein each banner is received for display based on the history data associated with each selection screen selected by the user.

13. An information processing method by one or a plurality of computers, the method comprising:

sending, to a server, history data including user action history of a user related to distribution or viewing of a video;

receiving, from the server, rendering data for banners associated with a plurality of selection screens selectable by the user, the banners each having a banner display condition matching the history data of the user, and recording the rendering data in a memory; and displaying the banners on the selection screens using the rendering data received, wherein each banner is received for display based on the history data associated with each selection screen selected by the user.

* * * * *